US011740468B2

(12) United States Patent
Yamasaki et al.

(10) Patent No.: US 11,740,468 B2
(45) Date of Patent: Aug. 29, 2023

(54) DISTANCE MEASURING APPARATUS, IMAGING DEVICE, DISTANCE MEASURING SYSTEM, DISTANCE MEASURING METHOD, AND IMAGING METHOD

(71) Applicant: MAXELL, LTD., Kyoto (JP)

(72) Inventors: Koji Yamasaki, Tokyo (JP); Yusuke Nakamura, Tokyo (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 17/276,745

(22) PCT Filed: Sep. 18, 2018

(86) PCT No.: PCT/JP2018/034519
§ 371 (c)(1),
(2) Date: Mar. 16, 2021

(87) PCT Pub. No.: WO2020/059029
PCT Pub. Date: Mar. 26, 2020

(65) Prior Publication Data
US 2022/0043265 A1    Feb. 10, 2022

(51) Int. Cl.
G02B 27/01    (2006.01)
G02B 5/18     (2006.01)
G02B 27/00    (2006.01)

(52) U.S. Cl.
CPC ....... G02B 27/0172 (2013.01); G02B 5/1814 (2013.01); G02B 5/1876 (2013.01);
(Continued)

(58) Field of Classification Search
CPC .............. G02B 27/0172; G02B 5/1814; G02B 2027/0138; G02B 2027/014; G02B 2027/0178; G02B 27/0093; G02B 5/1876
(Continued)

(56) References Cited

U.S. PATENT DOCUMENTS 10,551,532 B2 *  2/2020  Nakamura ......... H04N 5/23245
10,887,504 B2 *  1/2021  Yamaguchi ...... H04N 5/232125
(Continued)

FOREIGN PATENT DOCUMENTS

JP    04-301507 A    10/1992
JP    2014-187484 A  10/2014
(Continued)

OTHER PUBLICATIONS

International Search Report issued in corresponding International Patent Application No. PCT/JP2018/034519, dated Dec. 11, 2018, with English translation.

Primary Examiner — Jason M Mandeville
(74) Attorney, Agent, or Firm — McDermott Will & Emery LLP

(57) ABSTRACT

An interframe difference processor 206 generates a difference image between frames of a sensor image, and an image processor 208 generates distance information indicating a distance to a photographic subject on the basis of calculation of a difference image and a developing pattern 1101. Thus, since a video display apparatus 101 generates the difference image between the frames of the sensor image, it is possible to realize a distance measuring apparatus capable of reducing an influence of a background and generating distance information with high accuracy.

10 Claims, 42 Drawing Sheets

(52) U.S. Cl.
CPC .... *G02B 27/0093* (2013.01); *G02B 2027/014* (2013.01); *G02B 2027/0138* (2013.01); *G02B 2027/0178* (2013.01)

(58) Field of Classification Search
USPC .............................................................. 345/8
See application file for complete search history.

(56) References Cited

U.S. PATENT DOCUMENTS

| | | | |
|---|---|---|---|
| 10,951,793 B2* | 3/2021 | Nakamura | ............. G02B 27/60 |
| 2018/0095200 A1 | 4/2018 | Nakamura et al. | |
| 2019/0339485 A1 | 11/2019 | Nakamura et al. | |
| 2021/0112266 A1* | 4/2021 | Nakade | .................. H04N 5/335 |

FOREIGN PATENT DOCUMENTS

| | | |
|---|---|---|
| JP | 2018-060549 A | 4/2018 |
| JP | 2018-061109 A | 4/2018 |
| WO | 2017/149687 A1 | 9/2017 |

* cited by examiner

PROJECTION IMAGE OF PHOTOGRAPHING PATTERN 405

$k$

FIG. 44
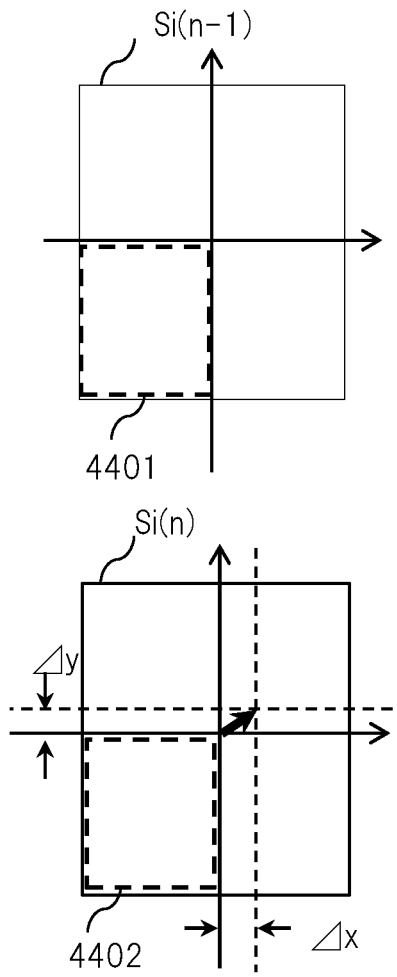
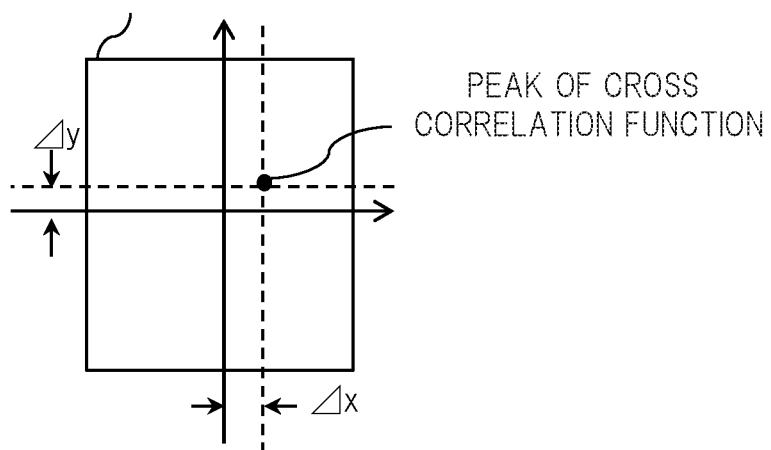

FIG. 45
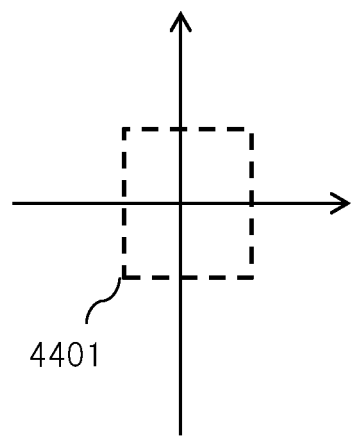
4401
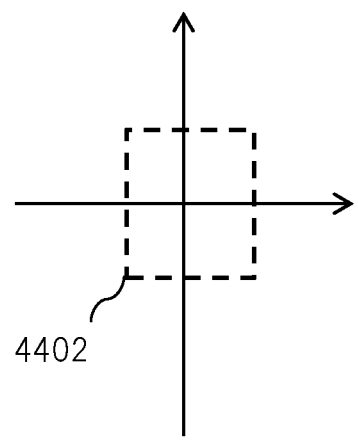
4402
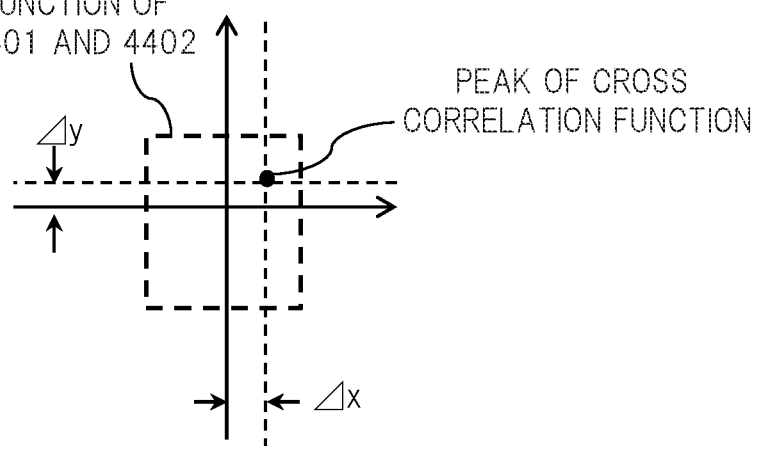

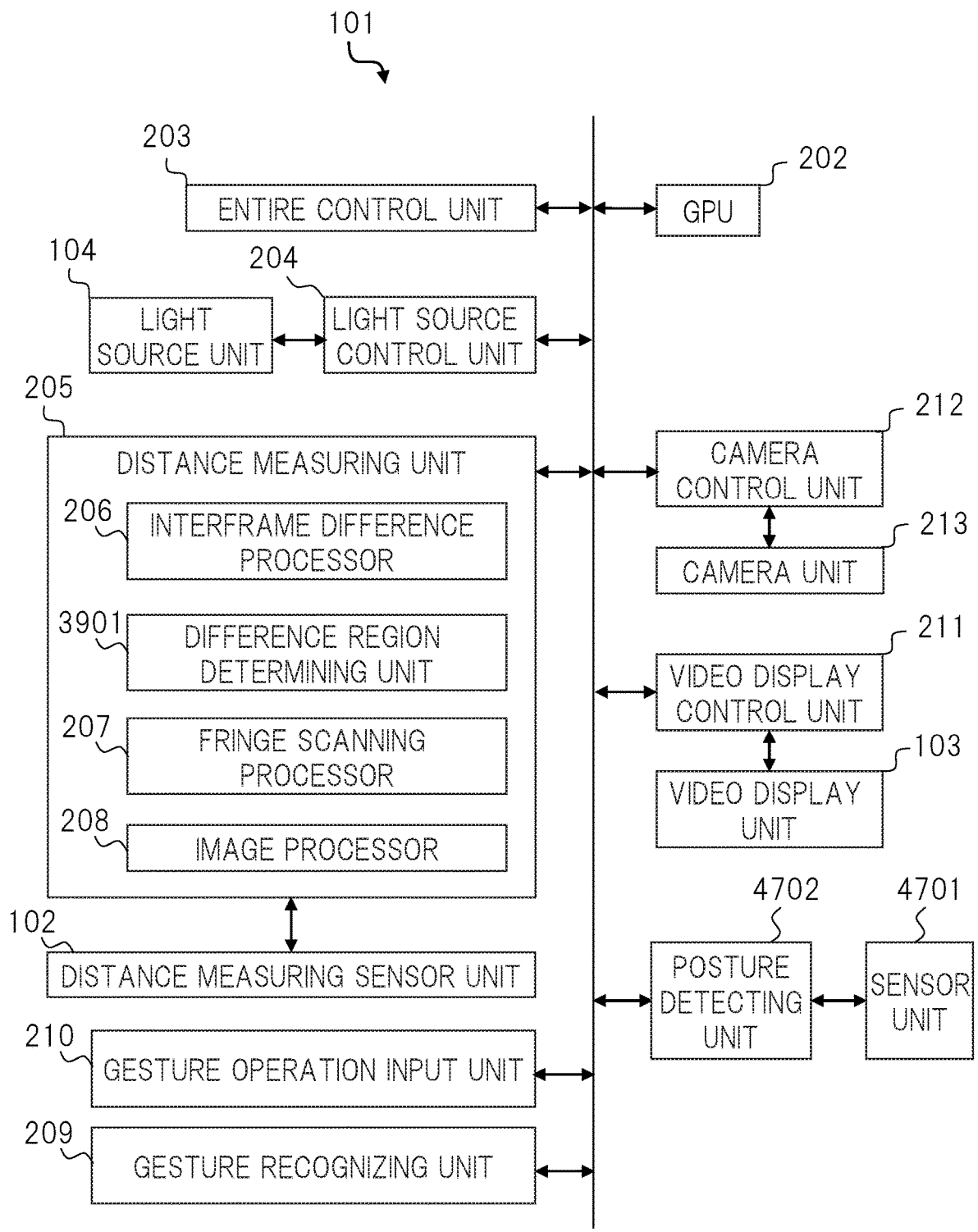

DISTANCE MEASURING APPARATUS, IMAGING DEVICE, DISTANCE MEASURING SYSTEM, DISTANCE MEASURING METHOD, AND IMAGING METHOD

CROSS REFERENCE

This application is the U.S. National Phase under 35 U.S.C. § 371 of International Application No. PCT/JP2018/034519, filed on Sep. 18, 2018, the entire contents are hereby incorporated by reference.

TECHNICAL FIELD

The present invention relates to a distance measuring apparatus, an imaging device, a distance measuring system, a distance measuring method, and an imaging method.

BACKGROUND ART

In order to support work in factory work and equipment maintenance work, a head mounted video display apparatus has been utilized. In many cases, a worker is holding an article necessary for objective work, and it is required that an input method to the video display apparatus is simple. Input means by a voice operation or a gesture operation has been devised.

In order to realize the gesture operation, it is necessary to recognize a target object (for example, fingers or the like of a wearer) to be gestured, and to further recognize a motion of the target object. A three-dimensional recognition technique using a range image is utilized for recognition of a target object and a motion thereof. However, a small and light distance measuring apparatus is required in order to reduce a load on a wearer. For example, as Patent document 1, a method of measuring a distance to a target object by attaching a special diffraction grating substrate to an image sensor and using a projection pattern generated on the image sensor by light transmitted through diffraction grating substrate has been devised.

RELATED ART DOCUMENTS

Patent Documents

Patent document 1: WO 2017/149687

SUMMARY OF THE INVENTION

Problems to be Solved by the Invention

In Patent document 1 described above, distance information (information indicating a distance to a target object) is generated from a relationship between contrast of an imaging result and a focus position. Now, in a case where a background is included in the imaging result, there is a possibility that an accurate distance cannot be measured due to this influence of the background and appropriate distance information cannot thus be generated.

It is an object of the present invention to provide a technique for generating distance information of a photographic subject more accurately in consideration of an influence of a background.

Means for Solving the Problem

The problem is solved by the invention described in claims, for example.

Effects of the Invention

According to the present invention, it becomes possible to generate distance information of a photographic subject more accurately in consideration of an influence of a background.

BRIEF DESCRIPTIONS OF THE DRAWINGS

FIG. 44 is a view for explaining a relationship of a cross correlation in the sensor image between a motion of a head of a wearer and a frame;

FIG. 45 is a view for explaining a relationship of a cross correlation in a partial region of the sensor image between the motion of the head of the wearer and the frame;

FIG. 47 is a view illustrating a configuration example of the head mounted video display apparatus on which a distance measuring apparatus according to a fourth embodiment is mounted.

DETAILED DESCRIPTION OF EMBODIMENTS

Figure 1:
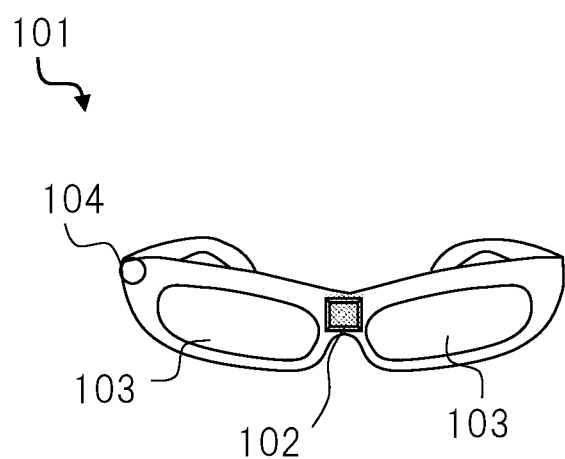
FIG. 1 is a schematic view of a head mounted video display apparatus on which a distance measuring apparatus according to a first embodiment is mounted.

In embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Further, in the embodiments described below, in a case of referring to the number of elements (including number of pieces, values, amount, range, and the like), the number of the elements is not limited to a specific number unless otherwise stated or except the case where the number is apparently limited to a specific number in principle, and the number larger or smaller than the specified number may also be applicable.

Moreover, in the embodiments described below, it goes without saying that the components (including element steps and the like) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Further, the same components are in principle denoted by the same reference numeral throughout the drawings for describing the embodiments, and the repetitive description thereof will be omitted.

Hereinafter, embodiments of the present invention will be described with reference to the drawings.

First Embodiment

An embodiment of a distance measuring apparatus according to the present invention will be described. This indicates that when distance information of a target object is generated, it is possible to reduce an influence of a background, and generate the distance information with high accurate.

In the present embodiment, the distance measuring apparatus according to the present invention is mounted on a head mounted video display apparatus to be used as a distance measuring sensor for gesture recognition.

First, a configuration of the head mounted video display apparatus according to the present embodiment will be described. FIG. 1 illustrates a schematic view of a head mounted video display apparatus 101 (the distance measuring apparatus) according to the present embodiment. This video display apparatus 101 is an apparatus that measures a distance to a photographic subject.

The video display apparatus 101 includes a distance measuring sensor unit 102, video display units 103, a light source unit 104, and an entire control unit (not illustrated in the drawings). The head mounted video display apparatus 101 may not have an eyeglass type so long as the head mounted video display apparatus 101 has a shape that can be worn on a head, and the video display unit may be one for one eye.

The distance measuring sensor unit 102 may not be installed at a central portion of the video display apparatus 101, but may be installed at an edge thereof, for example. In this case, by installing the distance measuring sensor unit 102 at the edge compared with a case where it is installed at the central portion as illustrated in FIG. 1, it is possible to improve designability because the distance measuring sensor unit 102 becomes inconspicuous. Further, the light source unit 104 is installed so as to be capable of irradiating a region equal to or more than a distance measuring range of the distance measuring sensor unit 102. For example, in a case where an irradiation range of a light source is narrow, it is possible to expand the irradiation range by installing a plurality of light sources, for example, installing them at both ends.

Figure 2:
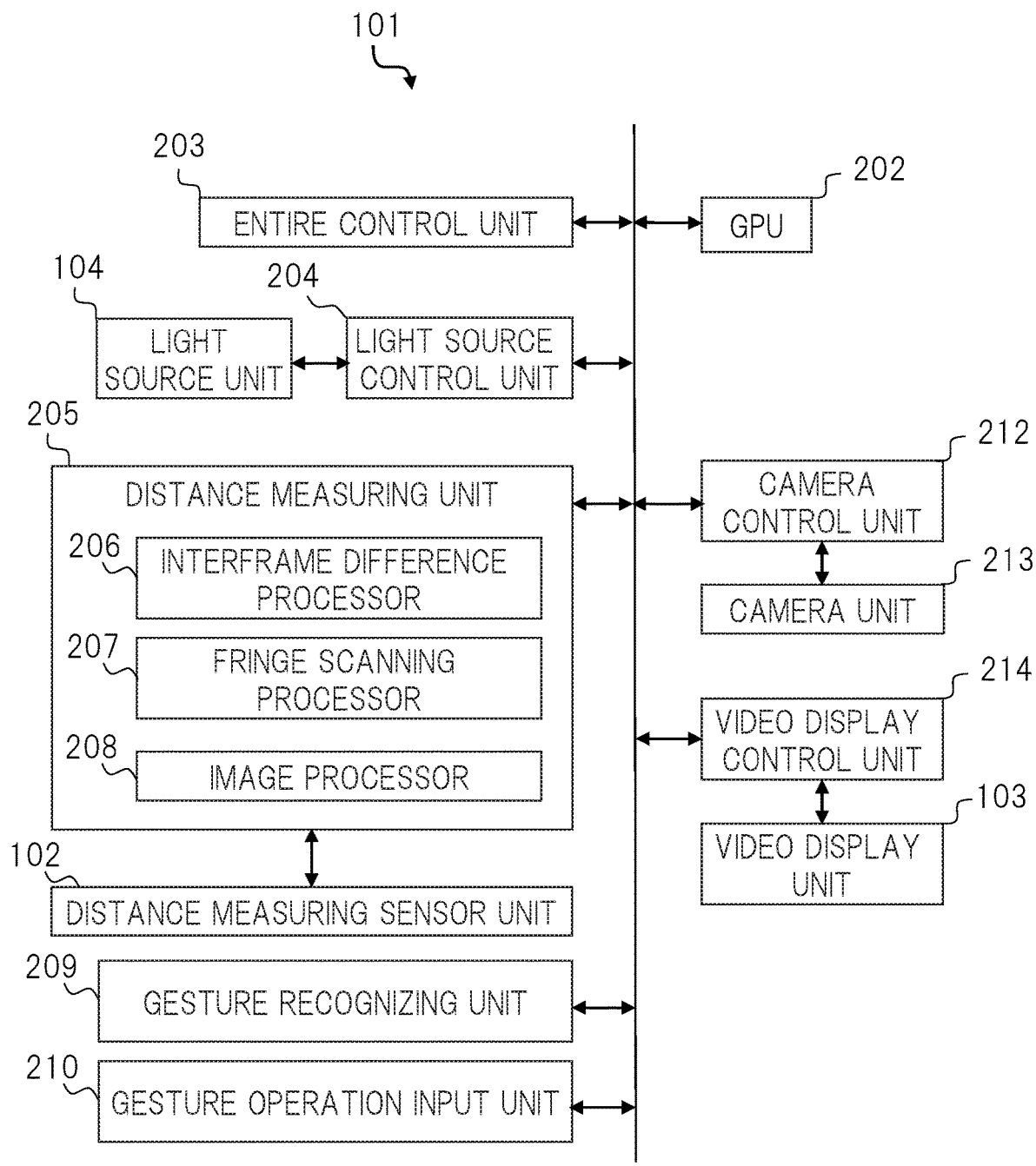
FIG. 2 is a view illustrating a configuration example of the head mounted video display apparatus on which the distance measuring apparatus according to the first embodiment is mounted.

FIG. 2 is a block diagram illustrating one embodiment of a configuration of the video display apparatus 101 according to the present embodiment. The present embodiment is an example in which a video displaying function and a calculation processing function are integrated in a video display apparatus to be worn on a head. A CPU (Central Processing Unit) 201 is a central processing unit, and executes control processing in the present video display apparatus.

A GPU (Graphics Processing Unit) 202 is a calculating unit specialized in real-time image processing, and mainly bears processes regarding image processing. An entire control unit 203 is realized by a CPU or the like, and controls the entire processing in the video display apparatus 101. A light source control unit 204 controls the light source unit 104. The light source unit 104 irradiates near infrared light, for example. A distance measuring unit 205 controls the distance measuring sensor unit 102. A video display control unit 211 controls the video display unit 103. A camera control unit 212 controls a camera unit 213 to photograph a still image, a moving image and the like of the outside world, for example. The camera unit 213 is imaging means.

A gesture recognizing unit 209 detects and recognizes gesture on the basis of distance information generated by the distance measuring unit 205 (information indicating the distance to the photographic subject). A gesture operation input unit 210 inputs the gesture recognized by the gesture recognizing unit 209 as an input operation to the video display apparatus 101.

Figure 3:
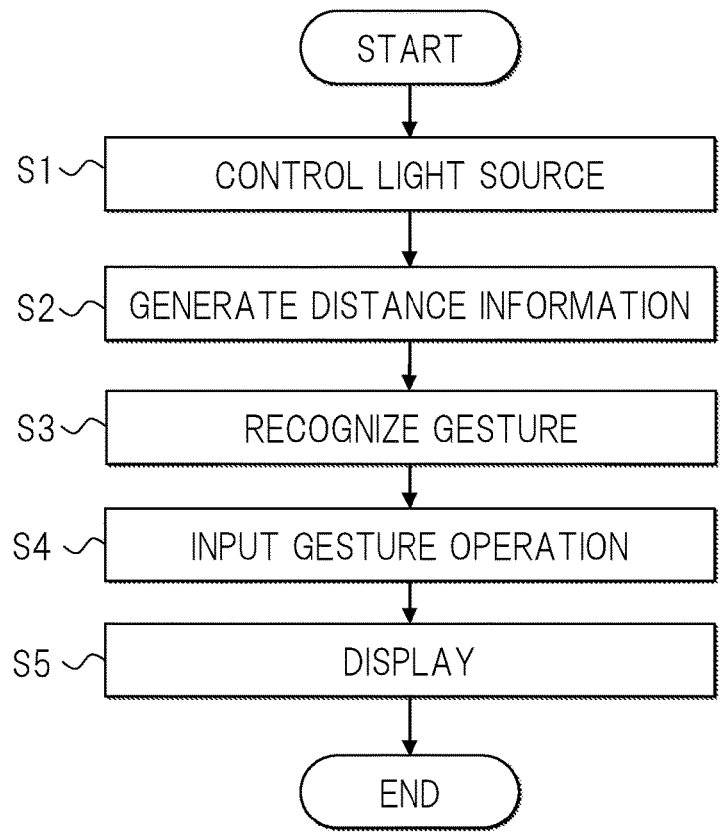
FIG. 3 is a flowchart illustrating a process example according to the embodiment of the video display unit apparatus.

A processing flow of the video display apparatus 101 illustrated in FIG. 2 will be described with reference to FIG. 3. The entire control unit 203 controls the entire present flow. At Step S1, the light source control unit 204 controls the light source unit 104 to adjust an amount of light to be irradiated. Next, at Step S2, the distance measuring unit 205 controls the distance measuring sensor unit 102 to generate distance information from an obtained image. At Step S3, the gesture recognizing unit 209 executes gesture recognition by using the distance information generated by the distance measuring unit 205. At Step S4, a gesture recognition result is inputted into the gesture operation input unit 210 to be received as an input operation. At Step S5, a response according to the input operation is displayed on the video display unit 103 by the video display control unit 211.

Before describing a configuration of the distance measuring unit 205, a basic principle of imaging and distance measuring using the distance measuring sensor unit 102 will be described.

<Principle of Photographing Infinity Object>

Figure 4:
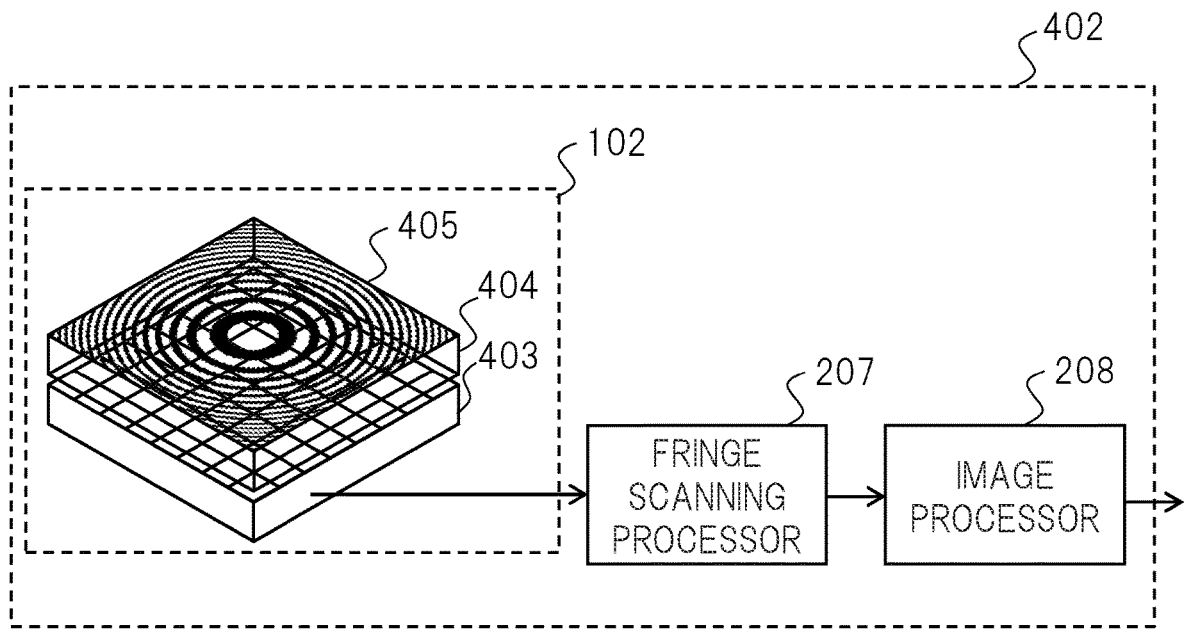
FIG. 4 is a view illustrating a configuration example of a basic imaging device using a distance measuring sensor.

FIG. 4 is an explanatory drawing illustrating one embodiment of a basic configuration of an imaging device using a distance measuring sensor according to the present embodiment. An imaging device 402 is configured to obtain an image of an object in the outside world without using a lens for forming an image. As illustrated in FIG. 4, the imaging device 402 calculates the image obtained by the distance measuring sensor unit 102 by a fringe scanning processor 207 (a complex sensor image processor) and an image processor 208. The imaging device 402 described above is a device that includes the functions of the distance measuring sensor unit 102 and the distance measuring unit 205.

Figure 5:
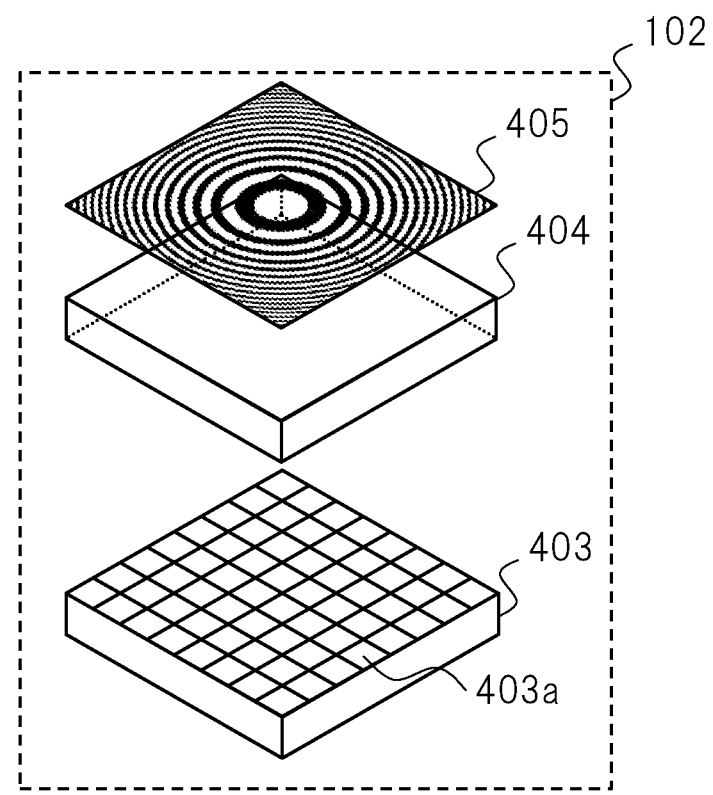
FIG. 5 is a view illustrating a configuration example of an imaging unit in the basic imaging device using the distance measuring sensor.

FIG. 5 illustrates one embodiment of the distance measuring sensor unit 102. The distance measuring sensor unit 102 includes an image sensor 403, a pattern substrate 404, and a photographing pattern 405 (a first grid pattern). The pattern substrate 404 is closely fixed to a light receiving surface of the image sensor 403, and has a configuration in which the photographing pattern 405 is formed on the pattern substrate 404.

The pattern substrate 404 is made of transparent material, such as glass or plastic, with respect to visible light, for example. The photographing pattern 405 is formed by depositing metal such as aluminum or chromium by a sputtering method used for a semiconductor process, for example. A pattern can be shaded by a pattern in which aluminum is deposited and a pattern in which aluminum is not deposited.

Note that formation of the photographing pattern 405 is not limited to this. For example, the pattern may be formed by shading by means of printing of an ink jet printer. The pattern may be formed by any means so long as modulation of a transmission factor can be realized. Further, for example, when photographing by far infrared ray is executed, material transparent to the far infrared ray, such as germanium, silicon, or chalcogenide, that is, material transparent to a wavelength that becomes a photographing target may be used for the pattern substrate 404, for example, and material that blocks the far infrared ray may be used for the photographing pattern 405.

Figure 6:
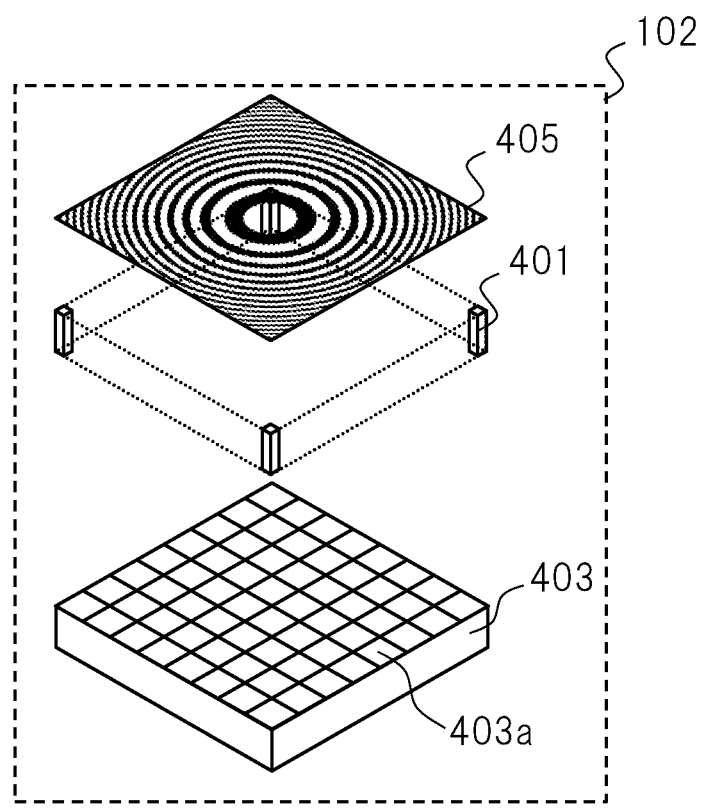
FIG. 6 is a view illustrating another configuration example of the imaging unit in the basic imaging device using the distance measuring sensor.

Note that the method of forming the photographing pattern 405 on the pattern substrate 404 has been mentioned herein, but as illustrated in FIG. 6, it can also be realized by forming the photographing pattern 405 as a thin film, and holding the photographing pattern 405 by supporting members 401. Note that in this apparatus, a photographing field angle can be changed by a thickness of the pattern substrate 404. Therefore, for example, when the pattern substrate 404 is configured as illustrated in FIG. 6 and has a function to be capable of changing a length of each of the supporting members 401, it is possible to execute photographing while changing a field angle during the photographing.

As illustrated in FIG. 5 or FIG. 6, the image sensor 403 is composed of a CCD (Charge Coupled Device) image sensor or a CMOS (Complementary Metal Oxide Semiconductor) image sensor, for example. Pixels 403a, which are light receiving elements, are arranged in an array on an imaging surface (the light receiving surface) of the image sensor 403. The intensity of light transmitted through the photographing pattern 405 is modulated by the grid pattern, and the light is received by the image sensor 403. The image sensor 403 converts a light image received by the pixels 403a into an image signal that is an electric signal, and outputs a sensor image based on the photographic subject.

Note that the image signal (analog image data) is converted into a digital signal via an analog/digital converting circuit, for example, and the digital signal is outputted as digital image data. In the present specification, a case where the distance measuring sensor unit 102 outputs the image data will be described.

The fringe scanning processor 207 removes noise by fringe scanning on the image data (the sensor image) outputted from the image sensor 403, and outputs the image data to the image processor 208. For example, the fringe scanning processor 207 generates a complex sensor image having a complex number from the sensor image. The image processor 208 executes predetermined image processing for the image data outputted from the fringe scanning processor 207 to convert a data format thereof if necessary, store the image data in a storage device (not illustrated in the drawings) of the imaging device 402, and output them to an external host computer or an external recording medium.

Subsequently, a photographing principle in the imaging device 402 will be described. First, the photographing pattern 405 is a concentric circle-shaped pattern in which pitches fine down so as to be inversely proportional to radii from a center thereof, and is defined as Formula (1) as follows by using a radius r from a reference coordinate that is a center of the concentric circles and a coefficient $\beta$.

$$I(r) = 1 + \cos \beta r^2 \quad \text{Formula (1)}$$

Figure 7:
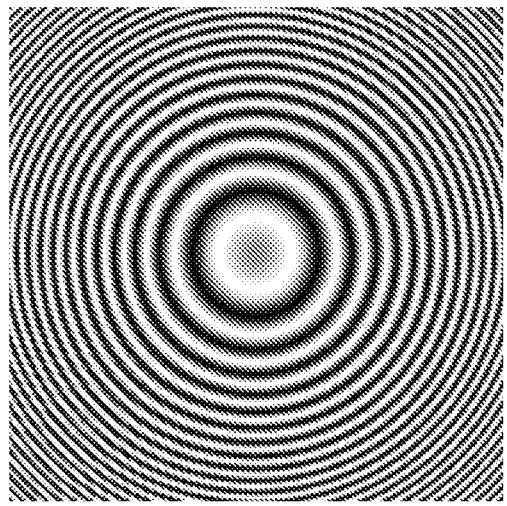
FIG. 7 is a view illustrating one embodiment of a photographing pattern.
Figure 8:
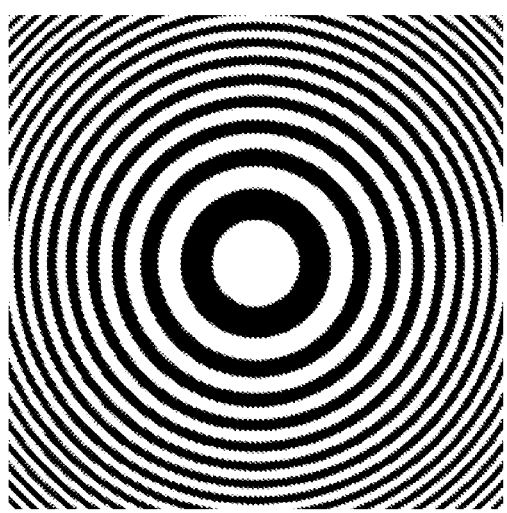
FIG. 8 is a view illustrating another example of the photographing pattern.

A transmission factor of the photographing pattern 405 is modulated so as to be proportional to this formula. A plate with such fringes is called as a Gabor zone plate or a Fresnel zone plate. FIG. 7 illustrates an example of the Gabor zone plate of Formula (1). FIG. 8 illustrates an example of the Fresnel zone plate by binarizing Formula (1) by a threshold value 1. Note that, hereinafter, only an x axis direction will be described by formulas for simplification, but it is possible to two-dimensionally develop and consider the plate by considering a y axis direction in the similar manner.

Figure 9:
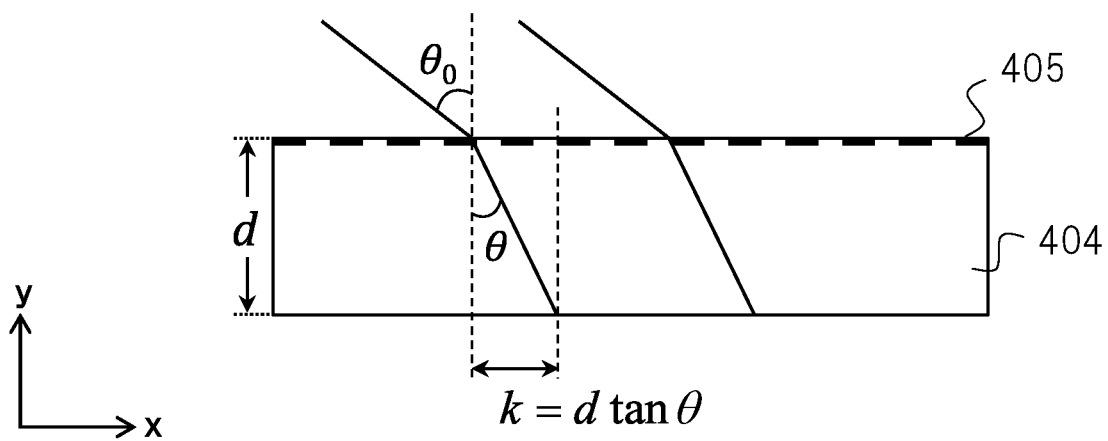
FIG. 9 is a view for explaining that a projection image from a pattern substrate surface to an image sensor by oblique incidence parallel light generates in-plane shift.

It is assumed that as illustrated in FIG. 9, parallel light enters the pattern substrate 404, on which the photographing pattern 405 is formed, with a thickness d at an angle $\theta_0$ with respect to the y axis direction. By defining a refracting angle in the pattern substrate 404 as $\theta$, light multiplied by a transmission factor of a surface grid geometrical-optically enters the image sensor 403 while being shifted by $k = d \times \tan \theta$. At this time, a projection image with intensity distribution like Formula (2) as follows is detected on the image sensor 403.

$$I_F(x) = 1 + \cos[\beta(x+k)^2 + \Phi] \quad \text{Formula (2)}$$

Figure 10:
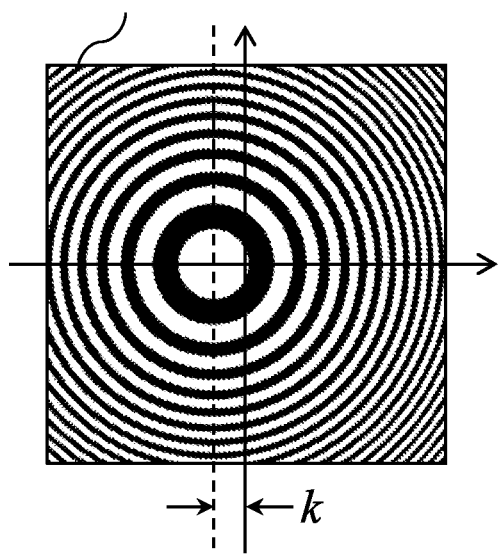
FIG. 10 is a view illustrating one embodiment of the projection image of the photographing pattern.

Note that $\Phi$ indicates an initial phase of transmissivity distribution of Formula (1). FIG. 10 illustrates an example of the projection image of this photographing pattern 405. The projection image is shifted by k and projected like Formula (2). This becomes an output of the distance measuring sensor unit 102.

Next, development processing by a correlation developing method and a moire developing method will be described in relation to the processing in the image processor 208.

Figure 11:
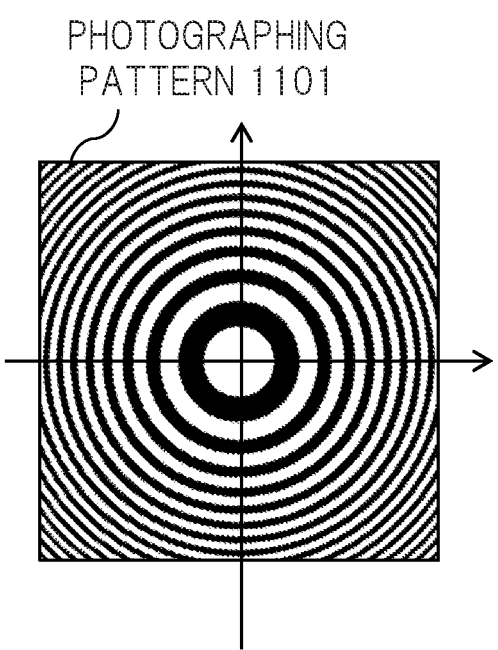
FIG. 11 is a view illustrating one embodiment of a developing pattern.
Figure 12:
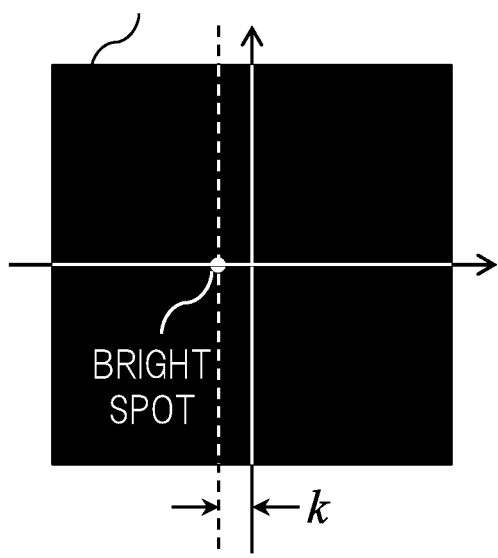
FIG. 12 is a view illustrating one embodiment of a development image by a correlation developing method.

In the correlation developing method, by calculating a cross correlation function between the projection image of the photographing pattern 405 illustrated in FIG. 10 and a developing pattern 1101 (a second grid pattern) illustrated in FIG. 11, a bright spot with a shift amount k illustrated in FIG. 12 is obtained. Note that Note that when the cross correlation calculation is executed by two-dimensional convolution calculation, a calculation amount generally becomes larger. Thus, a principle of an example of calculation using Fourier transform will be described using formulas. First, the developing pattern 1101 uses the Gabor zone plate or the Fresnel zone plate in the similar manner to the photographing pattern 405. Thus, by using an initial phase $\Phi$, the developing pattern 1101 is expressed as Formula (3) as follows.

$$I_B(x) = \cos(\beta x^2 + \Phi) \quad \text{Formula (3)}$$

Since the developing pattern 1101 is used in the image processing, it is not necessary to be offset by "one" as Formula (1), and there is no problem even if it has a negative value. Fourier transforms of Formulas (1) and (3) respectively become Formula (4) and Formula (5) as follows.

$$\mathcal{F}[I_F(x)] = \delta(u) + \frac{e^{-iku}}{2\sqrt{\pi\beta}} \sin\left(\frac{u^2}{4\beta} - \Phi + \frac{\pi}{4}\right) \quad \text{Formula (4)}$$

$$\mathcal{F}[I_B(x)] = \frac{1}{2\sqrt{\pi\beta}} \sin\left(\frac{u^2}{4\beta} - \Phi + \frac{\pi}{4}\right) \quad \text{Formula (5)}$$

Here, F indicates calculation of Fourier transform, u is a frequency coordinate in an x direction, and $\delta$ with parentheses is a delta function. What is important in this formula is that the formula after Fourier transform also becomes the Fresnel zone plate or the Gabor zone plate. Therefore, a developing pattern after Fourier transform may be generated directly on the basis of this mathematical formula. This makes it possible to reduce a calculation amount.

Next, by multiplying Formula (4) by Formula (5), it becomes Formula (6) as follows.

$$\mathcal{F}[I_F(x)] \cdot \mathcal{F}[I_B(x)] = \quad \text{Formula (6)}$$

$$\frac{1}{2\sqrt{\pi\beta}} \sin\left(\frac{\pi}{4} - \Phi\right)\delta(u) + \frac{e^{-iku}}{8\pi\beta} \cdot \left[\sin^2\left(\frac{u^2}{4\beta} - \Phi + \frac{\pi}{4}\right)\right]$$

The term exp(−iku) expressed by this exponential function is a signal component, and this term is subjected to Fourier transform to be converted as Formula (7) as follows. It is possible to obtain a bright spot at a position of k on the original x axis.

$$\mathcal{F}^{-1}[e^{-iku}] = 2\pi\delta(x+k) \quad \text{Formula (7)}$$

This bright spot indicates a light flux at infinite, and is no other than a photographing image by the imaging device 402 illustrated in FIG. 4.

Note that the correlation developing method may be realized by a pattern that is not limited to the Fresnel zone plate or the Gabor zone plate, for example, a random pattern so long as an autocorrelation function of the pattern has a single peak.

Figure 13:
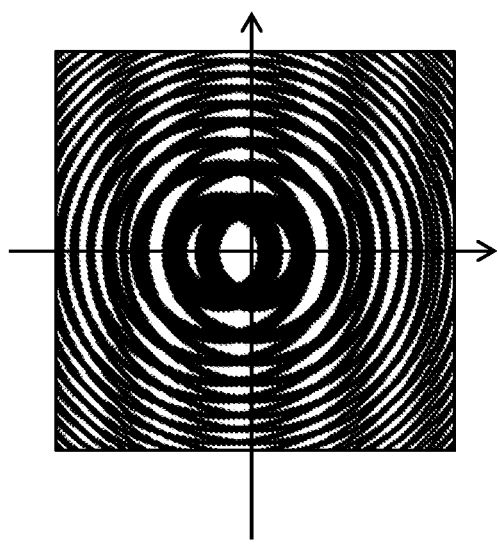
FIG. 13 is a view illustrating one embodiment of a moire fringe by a moire developing method.
Figure 14:
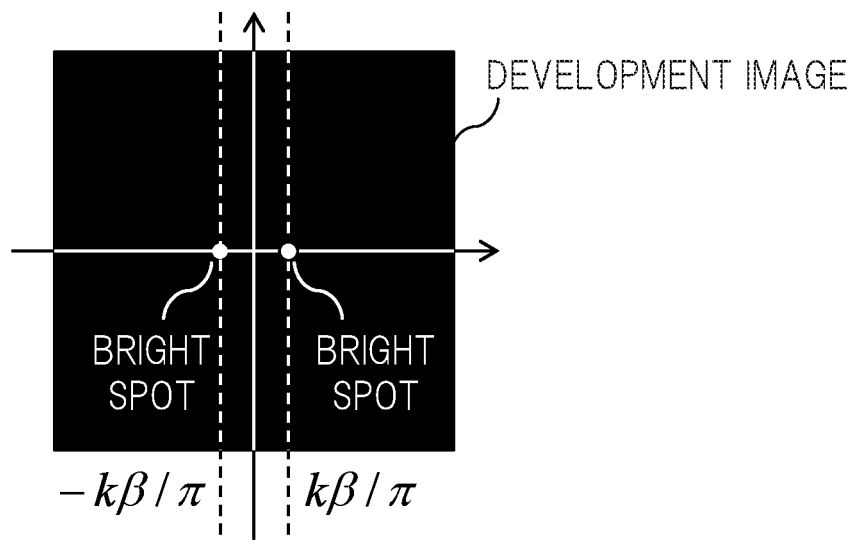
FIG. 14 is a view illustrating one embodiment of the development image by the moire developing method.

Next, in the moire developing method, the projection image of the photographing pattern 405 illustrated in FIG. 10 is multiplied by the developing pattern 1101 illustrated in FIG. 11 to generate a moire fringe illustrated in FIG. 13. By Fourier transform, bright spots with a shift amount $k\beta/\pi$ illustrated in FIG. 14 are obtained. When this moire fringe is indicated by a formula, it becomes Formula (8) as follows.

$$I_F(x) \cdot I_B(x) = \quad \text{Formula (8)}$$

$$\{1 + \cos[\beta(x+k)^2 + \Phi]\}\cos(\beta x^2 + \Phi) = \frac{1}{2}[2\cos(\beta x^2 + \Phi) +$$

$$\cos(2\beta x^2 + 2k\beta x + 2\beta k^2 + 2\Phi) + \cos(2k\beta x + \beta k^2)]$$

It can be seen that a third term of this expansion is a signal component and an area in which straight, equally spaced interval patterns are overlapped in the direction of shift of the two patterns. A fringe generated at relatively low spatial frequency due to such overlap of such fringes is called as a moire fringe. Two-dimensional Fourier transform of this third term becomes Formula (9) as follows.

$$\mathcal{F}[\cos 2k\beta x] = \delta\left(u + \frac{k\beta}{\pi}\right) + \delta\left(u - \frac{k\beta}{\pi}\right) \quad \text{Formula (9)}$$

Here, Here, F indicates calculation of Fourier transform, u is a frequency coordinate in the x direction, and δ with parentheses is a delta function. It can be seen from this result that a peak of spatial frequency occurs at a position of u=±kβ/π in a spatial frequency spectrum of the moire fringe. This bright spot indicates a light flux at infinite, and is no other than a photographing image by the imaging device 402 illustrated in FIG. 4.

<Noise Cancellation>

Although a signal component is focused in conversion from Formula (6) to Formula (7) and conversion from Formula (8) to Formula (9), terms other than the signal component actually impede the development. Therefore, noise cancellation based on fringe scanning is executed.

Figure 15:
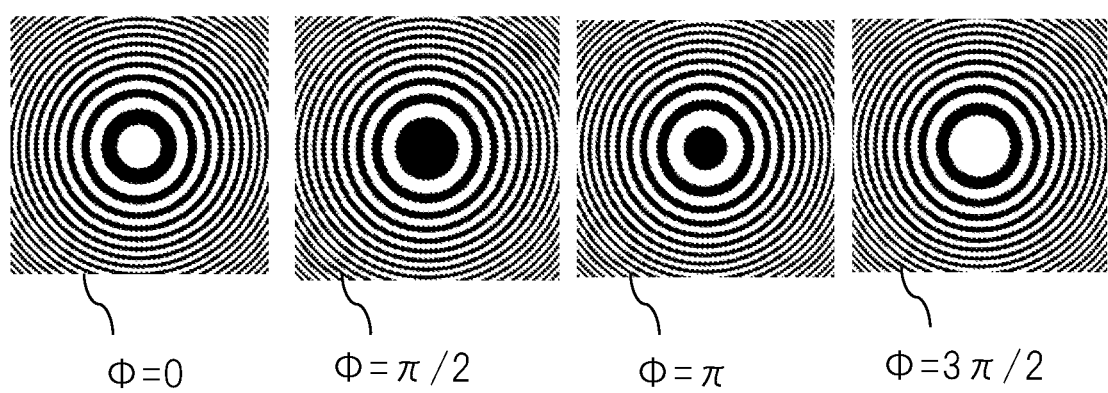
FIG. 15 is a view illustrating one embodiment of a combination of initial phases in fringe scanning.

For the fringe scanning, it is necessary to use a plurality of patterns each having a different initial phase Φ as the photographing pattern 405. FIG. 15 is a view illustrating one embodiment of a combination of the initial phases in the fringe scanning. Here, when sensor images, which are photographed using four phases Φ=0, π/2, π, and 3π/2, are calculated in accordance with Formula (10) as follows, sensor images of a complex number (complex sensor image) are obtained.

$$I_{CF}(x) = \frac{1}{2}\sum_{\Phi} I_F(x) \cdot \exp(i\Phi), \Phi \in \{0, \pi/2, \pi, 3\pi/2\} = \quad \text{Formula (10)}$$

$$\frac{1}{2}\sum_{\Phi} \{1 + \cos[\beta(x+k)^2 + \Phi]\} \cdot \exp(i\phi) = \exp[i\beta(x+k)^2]$$

Here, the developing pattern 1101 of the complex number can be expressed by Formula (11) as follows.

$$I_{CB}(x) = \exp(-i\beta x^2) \quad \text{Formula (11)}$$

Since the developing pattern 1101 is used in calculation processing, there is no problem even if it is a complex number. In case of the moire developing method, by multiplying Formula (10) by Formula (11), it becomes Formula (12) as follows.

$$I_{CF}(x) \cdot I_{CB}(x) = \exp[i\beta(x+k)^2] \cdot \exp(-i\beta x^2) = \exp[2i\beta kx + i\beta k^2] \quad \text{Formula (12)}$$

It can be seen that the term exp(2iβkx) expressed by this exponential function is a signal component, and the unnecessary term as in Formula (8) does not occur and noise is cancelled.

Similarly, when the correlation developing method is also confirmed, Fourier transforms of Formula (10) and Formula (11) respectively become Formula (13) and Formula (14) as follows.

$$\mathcal{F}[I_{CF}(x)] = \frac{1+i}{2\sqrt{2\pi\beta}}\exp(-iku)\exp\left(-i\frac{u^2}{4\beta}\right) \quad \text{Formula (13)}$$

$$\mathcal{F}[I_{CB}(x)] = -\frac{1+i}{2\sqrt{2\pi\beta}}\exp\left(i\frac{u^2}{4\beta}\right) \quad \text{Formula (14)}$$

Next, by multiplying Formula (13) by Formula (14), it becomes Formula (15) as follows.

$$\mathcal{F}[I_{CF}(x)] \cdot \mathcal{F}[I_{CB}(x)] = \frac{-i}{4\pi\beta}\exp(-iku) \quad \text{Formula (15)}$$

It can be seen that the term exp(−iku) expressed by this exponential function is a signal component, and the unnecessary term as in Formula (8) does not occur and noise is cancelled.

Note that the example described above has been described by using the plurality of patterns of the four phases. However, Φ may be set so as to divide an angle between 0 and 2π, and is not limited to these four phases.

In order to realize photographing by the plurality of patterns described above, there are a method of switching patterns by time division (time division fringe scanning) and a method of switching patterns by space division (space division fringe scanning).

In order to realize the time division fringe scanning, for example, the photographing pattern 405 is configured by a liquid crystal display element that can electrically switch and display (that is, can change patterns) a plurality of initial phases illustrated in FIG. 15. The distance measuring sensor unit 102 controls switch timing of this liquid crystal display element to synchronize with shutter timing of the image sensor 403, and the fringe scanning processor 207 executes fringe scanning calculation after four pieces of images are obtained.

Figure 16:
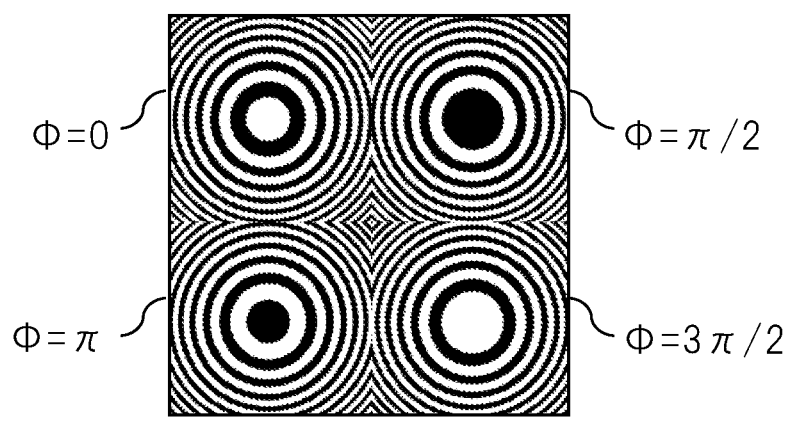
FIG. 16 is a view illustrating one embodiment of a photographing pattern in space division fringe scanning.

On the other hand, in order to realize the space division fringe scanning, for example, as illustrated in FIG. 16 (which is a view illustrating one embodiment of the photographing pattern 405 in the space division fringe scanning), the photographing pattern 405 having a plurality of initial phases is used. The distance measuring sensor unit 102 controls the shutter timing of the image sensor 403. After one piece of image is obtained, the fringe scanning processor 207 divides the obtained image into four images respectively corresponding to the patterns of the initial phases, and executes the fringe scanning calculation.

Figure 17:
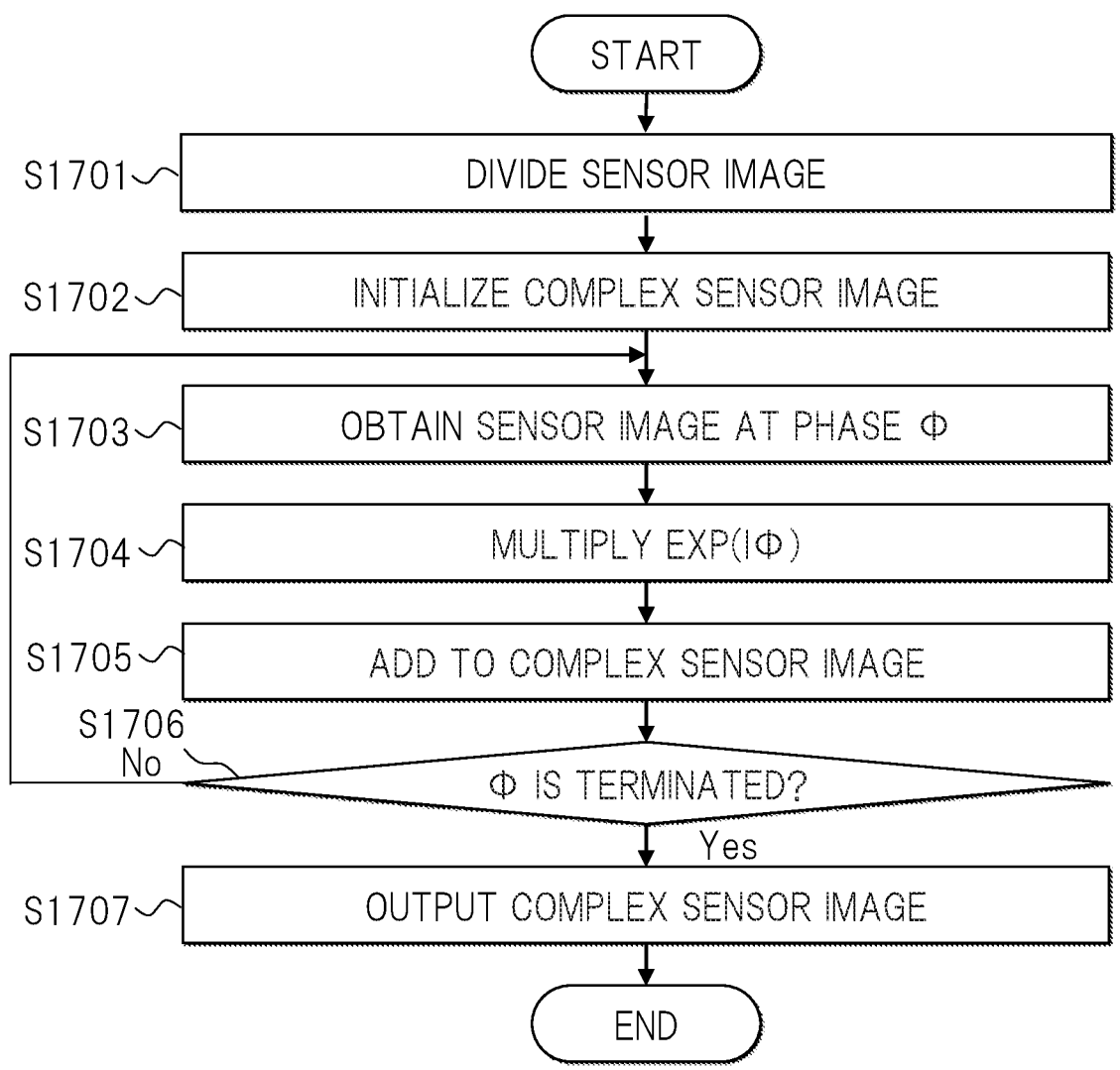
FIG. 17 is a flowchart illustrating a process example of a fringe scanning processor.

Subsequently, the fringe scanning calculation by the fringe scanning processor 207 will be described. FIG. 17 is a flowchart illustrating a process example of the fringe scanning processor 207.

First, the fringe scanning processor 207 obtains sensor images of a plurality of phase patterns outputted from the image sensor 403 (one piece in case of the space division fringe scanning, or plural pieces in case of the time division fringe scanning). In a case where the space division fringe scanning is used, the fringe scanning processor 207 divides the obtained sensor images for each phase (S1701). In a case where the time division fringe scanning is used, the process at S1701 is not executed. Next, the fringe scanning processor 207 initializes a complex sensor image for output (S1702).

Subsequently, the fringe scanning processor 207 repeats processes at S1703 to S1705 for each initial phase. For example, in the fringe scanning using the four phases as illustrated in FIG. 15, the processes are repeated four times for Φ=0, π/2, π, and 3π/2. The fringe scanning processor 207 obtains a sensor image of a target initial phase Φ (S1703); multiplies exp(iΦ) according to the initial phase Φ (S1704); and adds a multiplication result to the complex sensor image (S1705). The fringe scanning processor 207 determines whether the processes for all the initial phases are terminated or not (S1706). In a case where it is determined that the processes are not terminated (S1706: No), the processing flow returns to S1703. In a case where it is determined that the processes are terminated (S1706: Yes), the processing flow proceeds to S1707.

Finally, the fringe scanning processor 207 outputs the complex sensor image (S1707). The processes described above by the fringe scanning processor 207 correspond to Formula (10).

Figure 18:
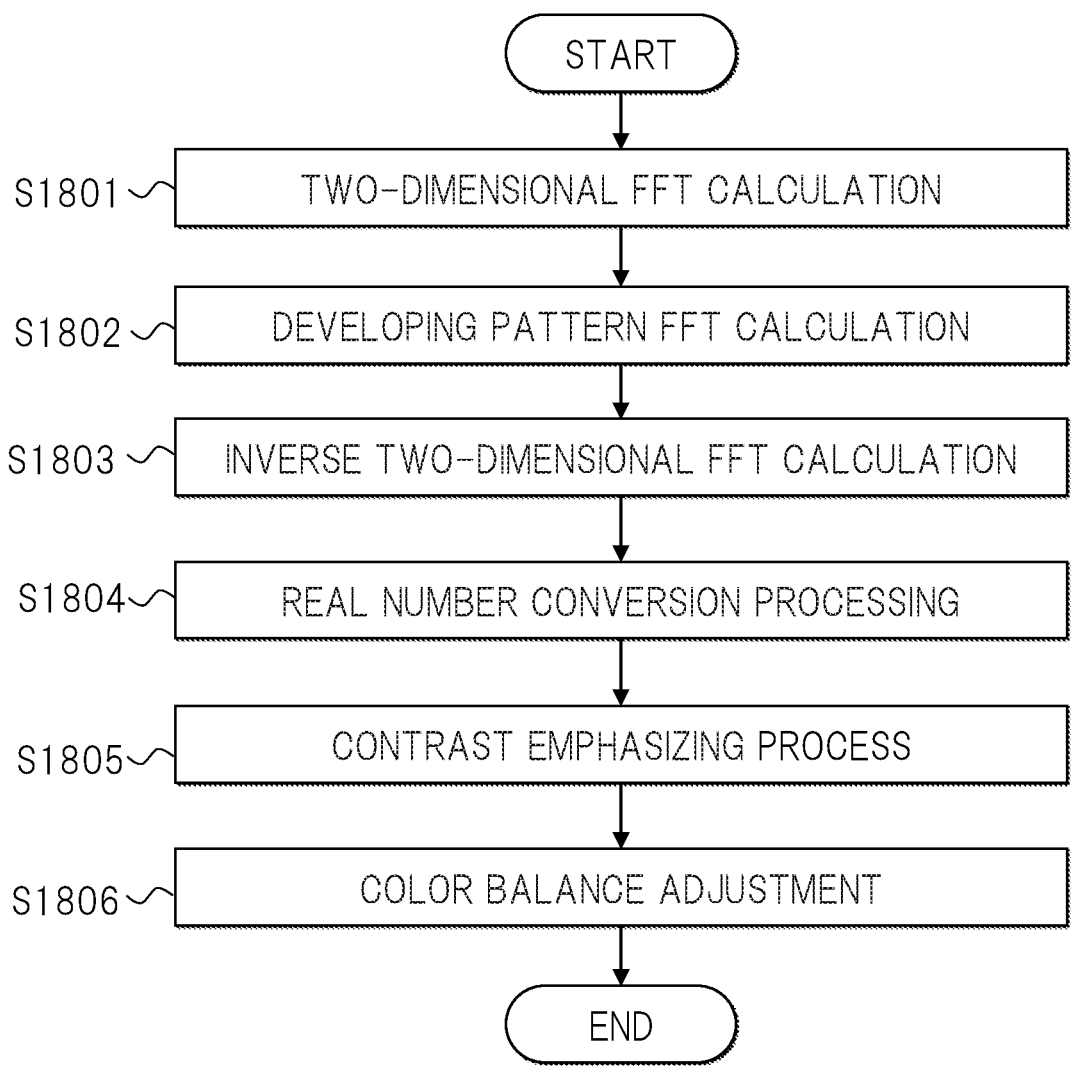
FIG. 18 is a flowchart illustrating a process example of an image processor by the correlation developing method.

Subsequently, image processing by the image processor 208 will be described. FIG. 18 is a flowchart illustrating a process example of the image processor 208 by the correlation developing method.

First, the image processor 208 obtains a complex sensor image outputted from the fringe scanning processor 207, and executes two-dimensional fast Fourier transform (FFT: Fast Fourier Transform) calculation for the complex sensor image (S1801). Next, the image processor 208 generates the developing pattern 1101 (the second grid pattern) used for development processing; multiplies it by the complex sensor image subjected to the two-dimensional FFT calculation (S1802); and executes inverse two-dimensional FFT calculation (S1803). Since this calculation result becomes a complex number, the image processor 208 converts the image as a photographing target into a real number, and develops (or restores) it by converting it into an absolute value or taking out a real part thereof (S1804). Then, the image processor 208 executes a contrast emphasizing process (S1805) and color balance adjustment (S1806) for the obtained development image, and outputs it as a photographed image. As described above, the image processing by the image processor 208 based on the correlation developing method is terminated.

Figure 19:
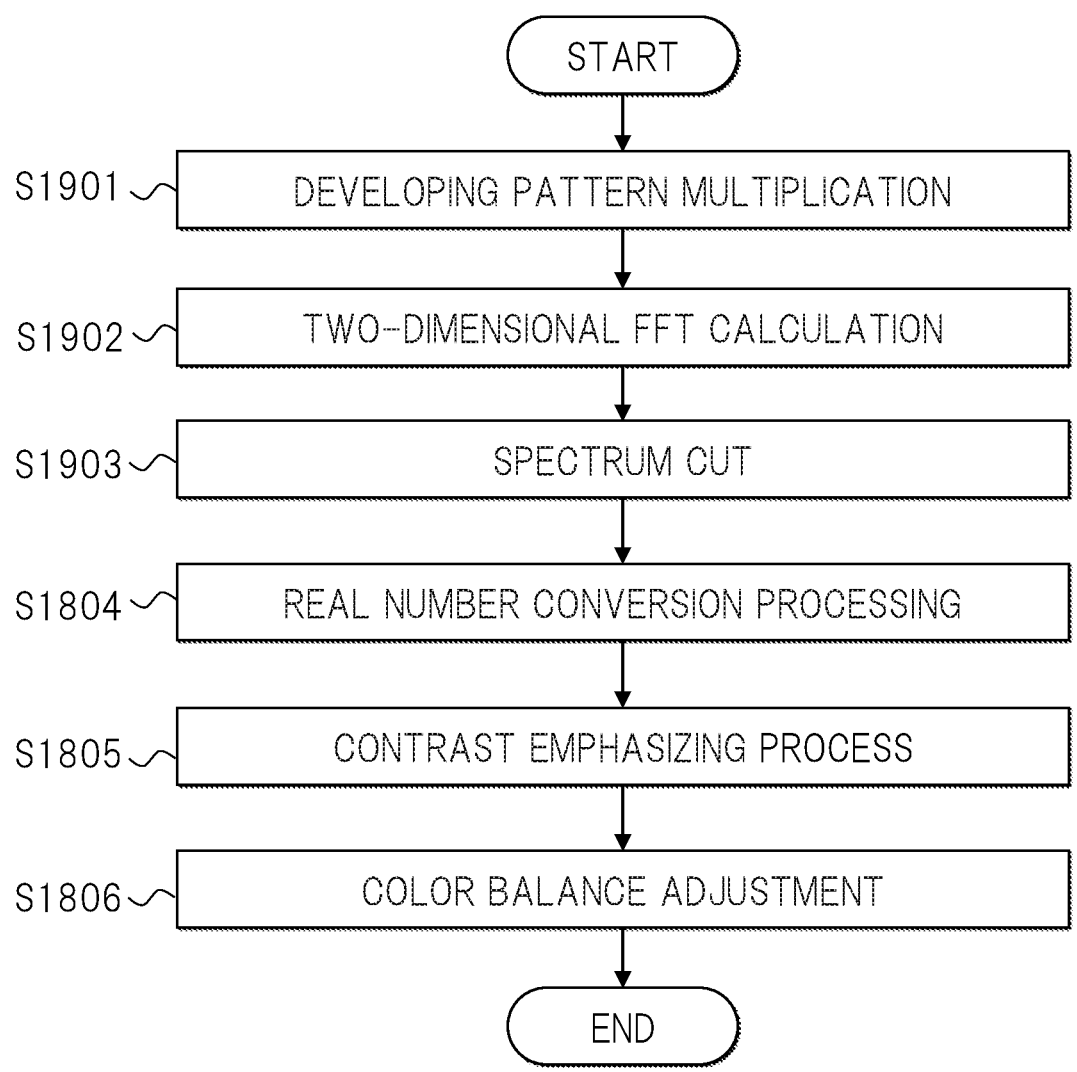
FIG. 19 is a flowchart illustrating a process example of the image processor by the moire developing method.

On the other hand, FIG. 19 is a flowchart illustrating a process example of the image processor 208 by the moire developing method.

First, the image processor 208 obtains a complex sensor image outputted from the fringe scanning processor 207. The image processor 208 generates the developing pattern 1101 to be used for development processing; multiplies it by the complex sensor image (S1901); obtains a frequency spectrum by two-dimensional FFT calculation (S1902); and cuts out data on a necessary frequency domain from this frequency spectrum (S1903). Subsequent processes in FIG. 18 are similar to the processes at S1804 to S1806. As described above, the image processing by the image processor 208 based on the moire developing method is terminated.

<Photograph Principle of Finite Distance Object>

Figure 20:
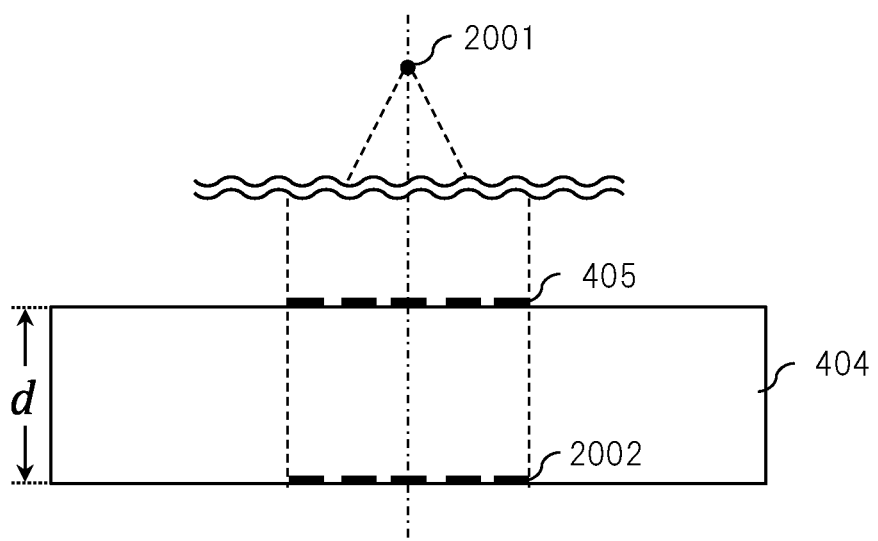
FIG. 20 is a view for explaining that a photographing pattern is projected in a case where an object is positioned at an infinite distance.

Next, FIG. 20 illustrates a state of projection of the photographing pattern 405 to the image sensor 403 in a case where the photographic subject, which has been described above, is far away. A spherical wave from a point 2001 constituting a faraway object becomes a plane wave while propagating a sufficiently long distance to irradiate the photographing pattern 405. In a case where a projection image 2002 thereof is projected to the image sensor 403, the projection image has substantially the same shape as that of the photographing pattern 405. As a result, it is possible to obtain a single bright spot by executing development processing for the projection image 2002 using a developing pattern.

Figure 21:
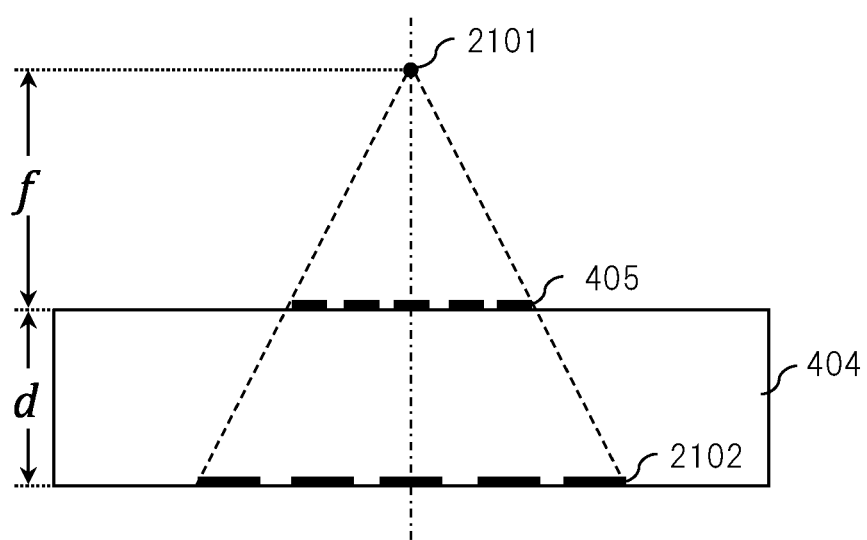
FIG. 21 is a view for explaining that a photographing pattern is enlarged in a case where an object is positioned at a finite distance.

On the other hand, imaging of an object with a finite distance will be described. FIG. 21 is an explanatory drawing illustrating that projection of the photographing pattern 405 to the image sensor 403 is enlarged by the photographing pattern 405 in a case where an object to be imaged is at a finite distance. In a case where a spherical wave from a point 2101 that constitutes an object irradiates the photographing pattern 405 and a projection image 2102 is projected to the image sensor 403, the projection image is enlarged substantially evenly. Note that this magnification ratio α can be calculated as Formula (16) as follows by using a distance f between the photographing pattern 405 and the point 2101.

$$\alpha = \frac{f+d}{f} \qquad \text{Formula (16)}$$

For that reason, if a developing pattern designed for parallel light is used as it is to execute development processing, it is impossible to obtain a single bright spot. Therefore, in a case where the developing pattern 1101 is enlarged in accordance with the evenly enlarged projection image of the photographing pattern 405, a single bright spot can be obtained again for the enlarged projection image 2102. For this reason, it is possible to correct a coefficient β of the developing pattern 1101 by setting $\beta/\alpha^2$. This makes it possible to selectively reproduce light from the point 2101 positioned at a distance that is not necessarily infinite. Therefore, it is possible to photograph the pattern by focusing on an arbitrary position. In other words, it is possible to calculate a distance to the arbitrary position. The present principle allows distance measurement as a distance measuring sensor.

Figure 22:
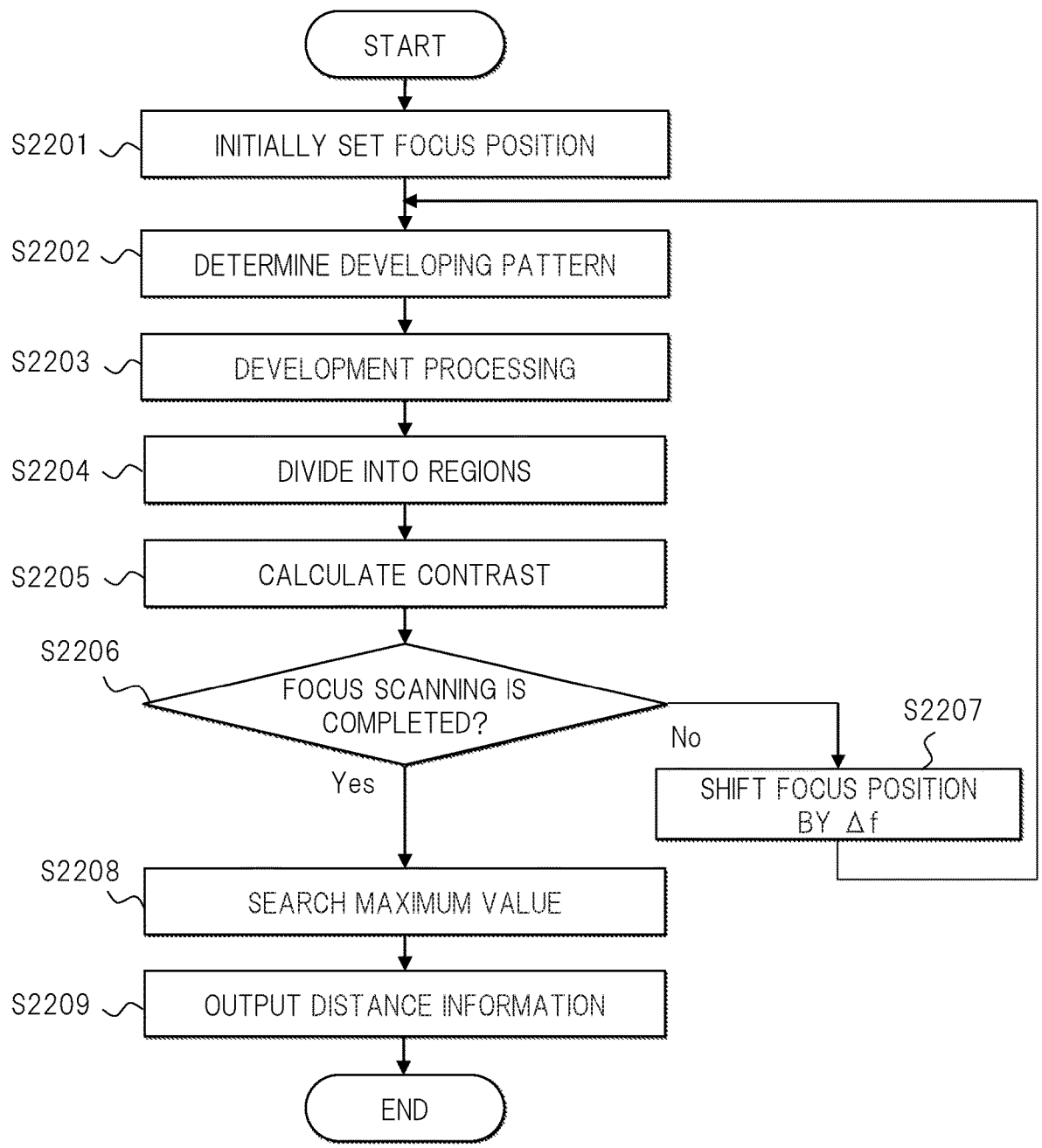
FIG. 22 is a flowchart illustrating one embodiment of a distance measuring process by the image processor.

FIG. 22 is a flowchart illustrating an outline of distance measurement by the imaging device 402. This distance measurement is realized by development processing while shifting a focus position by resolution Δf, and calculating a position at which the contrast becomes the maximum. This processing will be described in detail.

First, an initial value (infinity or distance zero, or the like) of the focus position is set (S2201); a magnification ratio α is calculated from the focus position; a coefficient β of the developing pattern 1101 is calculated (S2202); and the development processing is executed (S2203). This development processing is a process equivalent to the development processing described with reference to FIG. 18 or FIG. 19.

Figure 23:
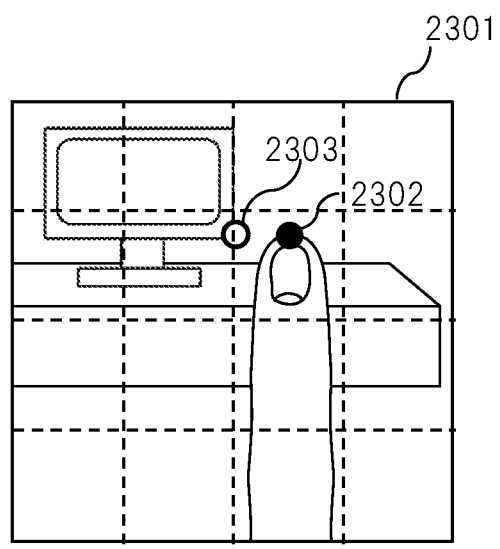
FIG. 23 is a view illustrating a calculating region for contrast in the distance measuring process.

Then, as illustrated in FIG. 23, a development image 2301 is divided (S2204). Next, contrast in each region of the divided regions is calculated by Formula (17) and Formula (18) as follows by using the maximum brightness Imax and the minimum brightness Imin in each region (S2205).

$$C = \frac{I_{max} - I_{min}}{I_{max} + I_{min}} \qquad \text{Formula (17)}$$

$$C = \frac{I_{max}}{I_{min}} \qquad \text{Formula (18)}$$

Then, the focus position is set by shifting by Δf (S2207), and the subsequent processes at S2202 to S2205 are executed until scanning in a variable focus range set in advance is completed (S2206). After the scanning is completed, a focus position at which contrast becomes the maximum is searched for each region (S2208), and distance information is outputted (S2209).

<Influence on Distance Measurement Accuracy by Interference of Background>

In the distance measurement that has been described, for example, in a case where a point 2302 forming a person who is a distance measuring target in FIG. 23 and a point 2303 forming a background that is far away and is not a distance measuring target exist nearby, blurring of the background affects the distance measuring target, and this affects distance measurement accuracy.

Figure 24:
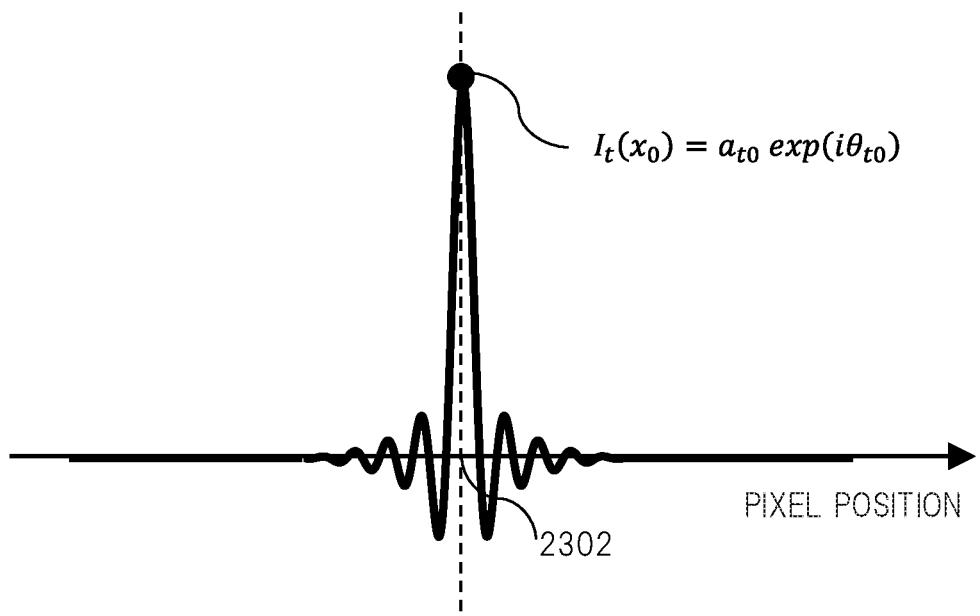
FIG. 24 is a view illustrating an example of a PSF (point spread function) in a case where only one light source exists in a visual field.

First, FIG. 24 illustrates an example of a PSF (point spread function) in a case where only the point 2302 exists in a visual field. A horizontal axis thereof indicates a pixel position of a development image, and a vertical axis thereof indicates amplitude. Note that information before the process to convert an image into a real number by the image processor 208 to develop (or restore) the image (S1804) is a complex number. Thus, this vertical axis indicates complex amplitude. When complex amplitude of the point 2302 at a pixel position x0 is Formula (19) as follows, a value obtained by real number conversion processing (S1804) becomes a square root of Formula (20) as follows.

$$I_t(x_0) = a_{t0} \exp(i\theta_{t0}) \quad \text{Formula (19)}$$

$$|I_t(x_0)|^2 = a_{t0}^2 \quad \text{Formula (20)}$$

Figure 25:
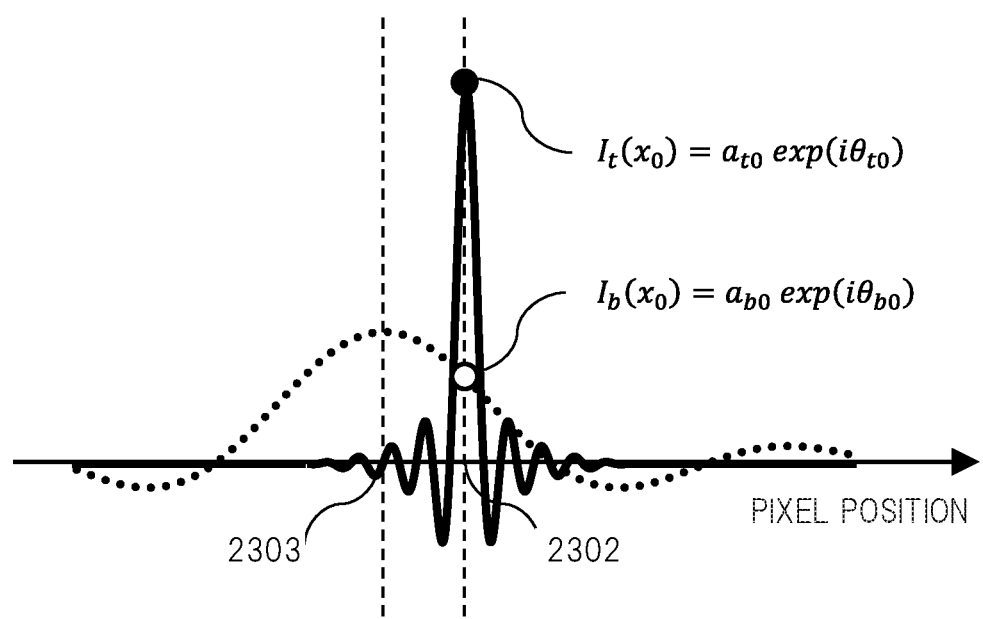
FIG. 25 is a view illustrating an example of a PSF (point spread function) in a case where two light sources exist in a visual field.

On the other hand, FIG. 25 illustrates an example of the PSF (point spread function) in a case where the point 2302 and the point 2303 exists in the visual field. When the point 2302 is in focus, the point 2303 becomes blurred. Thus, it becomes a PSF that is expanded as illustrated in FIG. 25. When complex amplitude of the point 2303 at the pixel position x0 is Formula (21) as follows, complex amplitude at the pixel position x0 before the real number conversion processing (S1804) becomes Formula (22) as follows, and a value obtained by the real number conversion processing (S1804) becomes a square root of Formula (23) as follows.

$$I_b(x_0) = a_{b0} \exp(i\theta_{b0}) \quad \text{Formula (21)}$$

$$I(x_0) = I_t(x_0) + I_b(x_0) = a_{t0} \exp(i\theta_{t0}) + a_{b0} \exp(i\theta_{b0}) \quad \text{Formula (22)}$$

$$|I(x_0)|^2 = a_{t0}^2 + a_{b0}^2 + 2a_{t0}a_{b0} \cos[\theta_{t0} + \theta_{b0}] \quad \text{Formula (23)}$$

When Formula (20) and Formula (23) are compared with each other, Formula (24) as follows, which is an interference component of the point 2302 and the point 2303, exists. This is a feature of this lensless camera system, which is not found in a conventional camera. This interference component affects distance measurement performance.

$$2a_{t0}a_{b0} \cos[\theta_{t0} + \theta_{b0}] \quad \text{Formula (24)}$$

In view of the principle described above, configurations of the distance measuring sensor unit 102 and the distance measuring unit 205 according to the present embodiment will be described.

Figure 26:
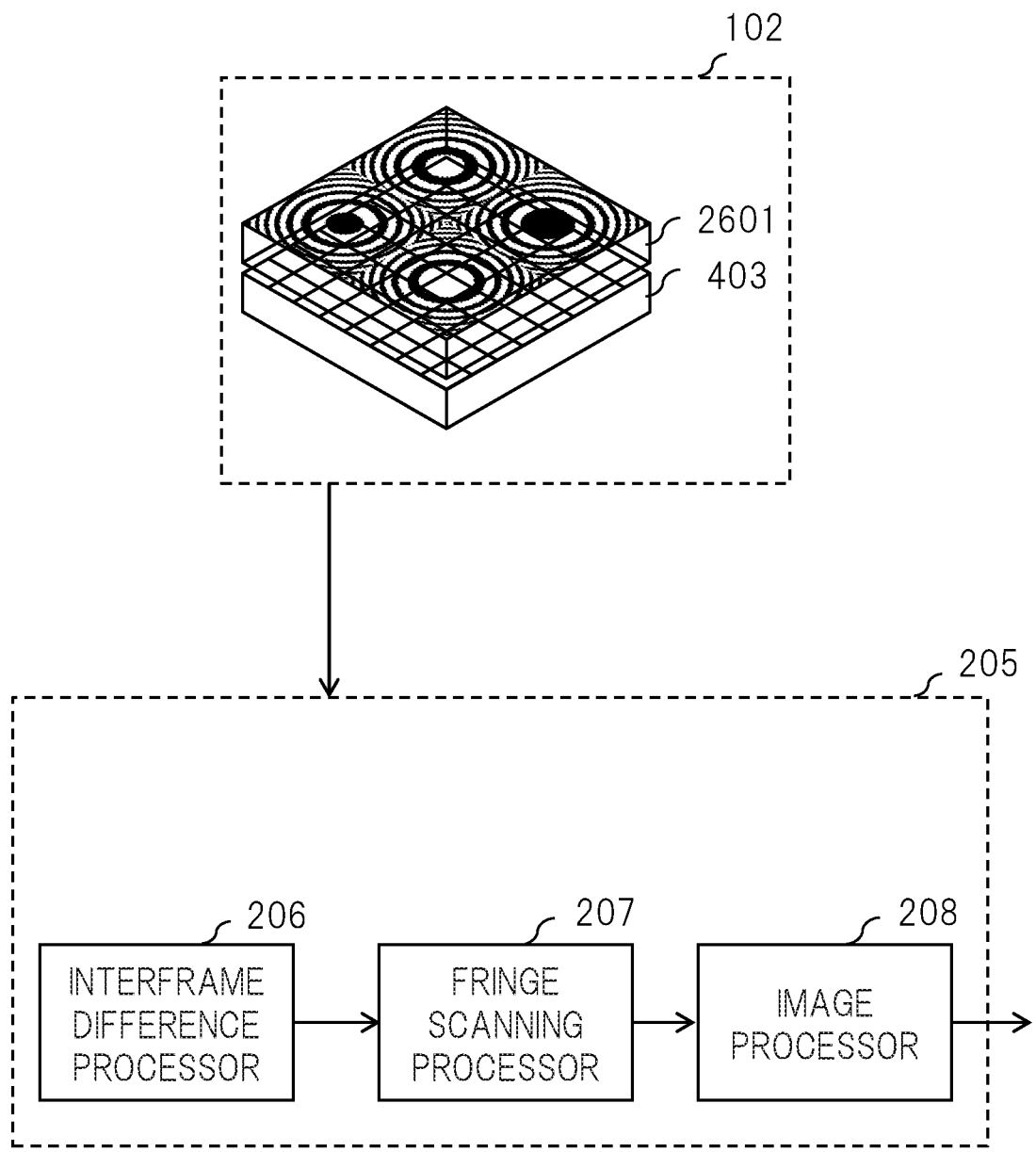
FIG. 26 is a view illustrating a configuration example of the distance measuring sensor and a distance measuring unit according to the first embodiment.

FIG. 26 illustrates the configurations of the distance measuring sensor unit 102 and the distance measuring unit 205. The distance measuring sensor unit 102 includes a modulator 2601 and the image sensor 403. The modulator 2601 is configured from the pattern substrate 404 and the photographing pattern 405 (the first grid pattern) illustrated in FIG. 4, for example. Patterns of the modulator 2601 are lens less configured to two-dimensionally arrange a plurality of initial phase patterns like patterns when the initial phases Φ of FIG. 16 are respectively {0, π/2, π, and 3π/2}, for example. The modulator 2601 modulates the intensity of light on the basis of the photographing pattern 405. Note that the image sensor 403 converts the light transmitted through the modulator 2601 described above into an electric signal, and generates a sensor image based on a photographic subject.

The distance measuring unit 205 includes an interframe difference processor 206, the fringe scanning processor 207, and the image processor 208.

The interframe difference processor 206 obtains the sensor image outputted from the distance measuring sensor unit 102, and generates a difference image between the obtained sensor image and a sensor image obtained before one frame. The interframe difference processor 206 generates the difference image between frames of the sensor images. For example, the interframe difference processor 206 generates a difference image between frames of complex sensor images.

The fringe scanning processor 207 obtains the difference image outputted from the interframe difference processor 206, and executes fringe scanning calculation.

The image processor 208 obtains the complex sensor image generated by the fringe scanning processor 207, and generates distance information.

Figure 27:
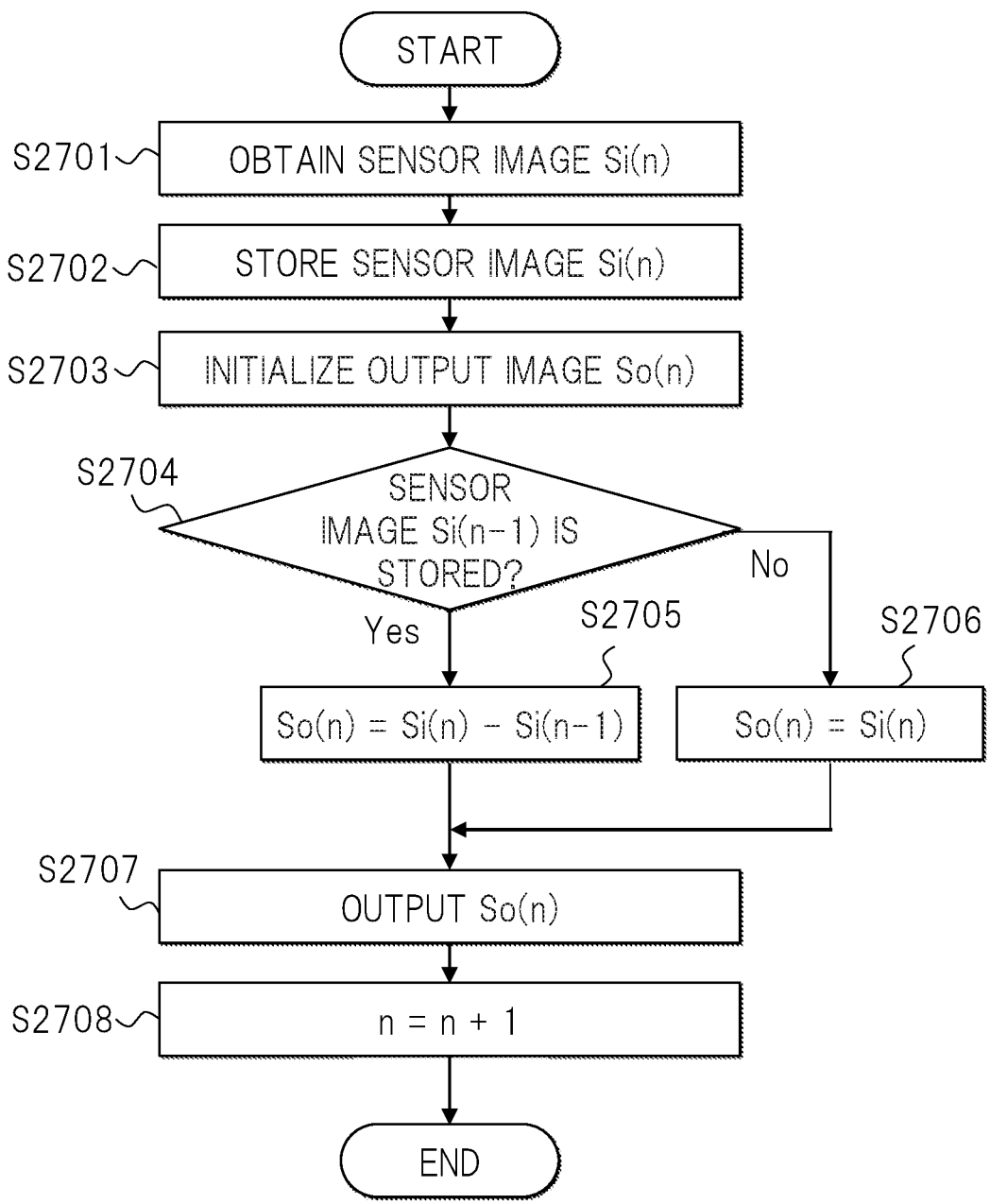
FIG. 27 is a flowchart illustrating a process example of an interframe difference processor.

FIG. 27 is a flowchart illustrating one embodiment of interframe difference processing by the interframe difference processor 206.

First, the interframe difference processor 206 obtains a sensor image Si(n) from the distance measuring sensor unit 102 (S2701). The "n" is a variable stored in a memory, and represents the number of times the sensor image is obtained from the distance measuring sensor unit 102. The "n" is initialized to zero when the video display apparatus 101 is activated. The sensor image Si(n) is a sensor image obtained at the nth times.

The interframe difference processor 206 stores the obtained sensor image Si(n) in the memory (S2702).

Next, the interframe difference processor 206 initializes an output image Si(n) (S2703). In a case where a sensor image Si(n−1) is stored (S2704: Yes), the interframe difference processor 206 generates a difference image between the sensor image Si(n) and the sensor image Si(n−1), and sets it to the output image So(n) (S2705).

In a case where the sensor image Si(n−1) is not stored (S2704: No), the interframe difference processor 206 sets the sensor image Si(n) to the output image So(n) (S2706). Thus, the interframe difference processor 206 determines whether the difference image of the frames is to be generated or not on the basis of a storage situation of the sensor images between the frames. In a case where it is determined that the difference image is not to be generated, the sensor image is outputted as the output image.

Finally, the interframe difference processor 206 outputs the output image So(n) (S2707) and increments the "n" (S2708), and the processing flow is terminated.

Note that although it is not described in FIG. 27, the interframe difference processor 206 may delete the sensor image Si(n−1) from the memory after the output image So(n) is generated.

Figure 28:
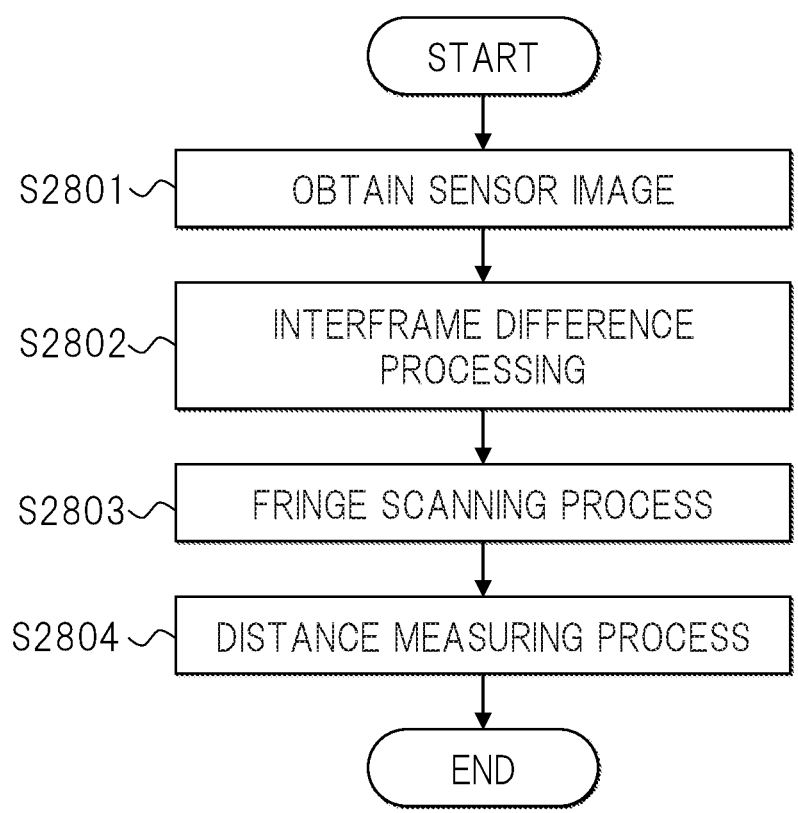
FIG. 28 is a flowchart illustrating a process example of the distance measuring unit.

FIG. 28 is a flowchart illustrating one embodiment of a distance measuring process by the distance measuring sensor unit 102 and the distance measuring unit 205 illustrated in FIG. 26.

First, the interframe difference processor 206 obtains the sensor image outputted from the distance measuring sensor unit 102 (S2801); executes processes equivalent to those in FIG. 27; and generates a difference image (S2802).

The fringe scanning processor 207 obtains the difference image generated by the interframe difference processor 206, and executes fringe scanning calculation (S2803). The fringe scanning calculation is a process equivalent to the processes at S1701 to S1707 illustrated in FIG. 17.

The image processor 208 executes distance measuring process by using the complex sensor image generated by the fringe scanning processor 207, and outputs distance information (S2804). The distance measuring process is a process equivalent to the processes at S2201 to S2209 illustrated in FIG. 22. Thus, the image processor 208 generates distance information indicating a distance to a photographic subject on the basis of calculation of the difference image and the developing pattern 1101.

Note that the processing order of the interframe difference processor 206 and the fringe scanning processor 207 may be exchanged.

Figure 29:
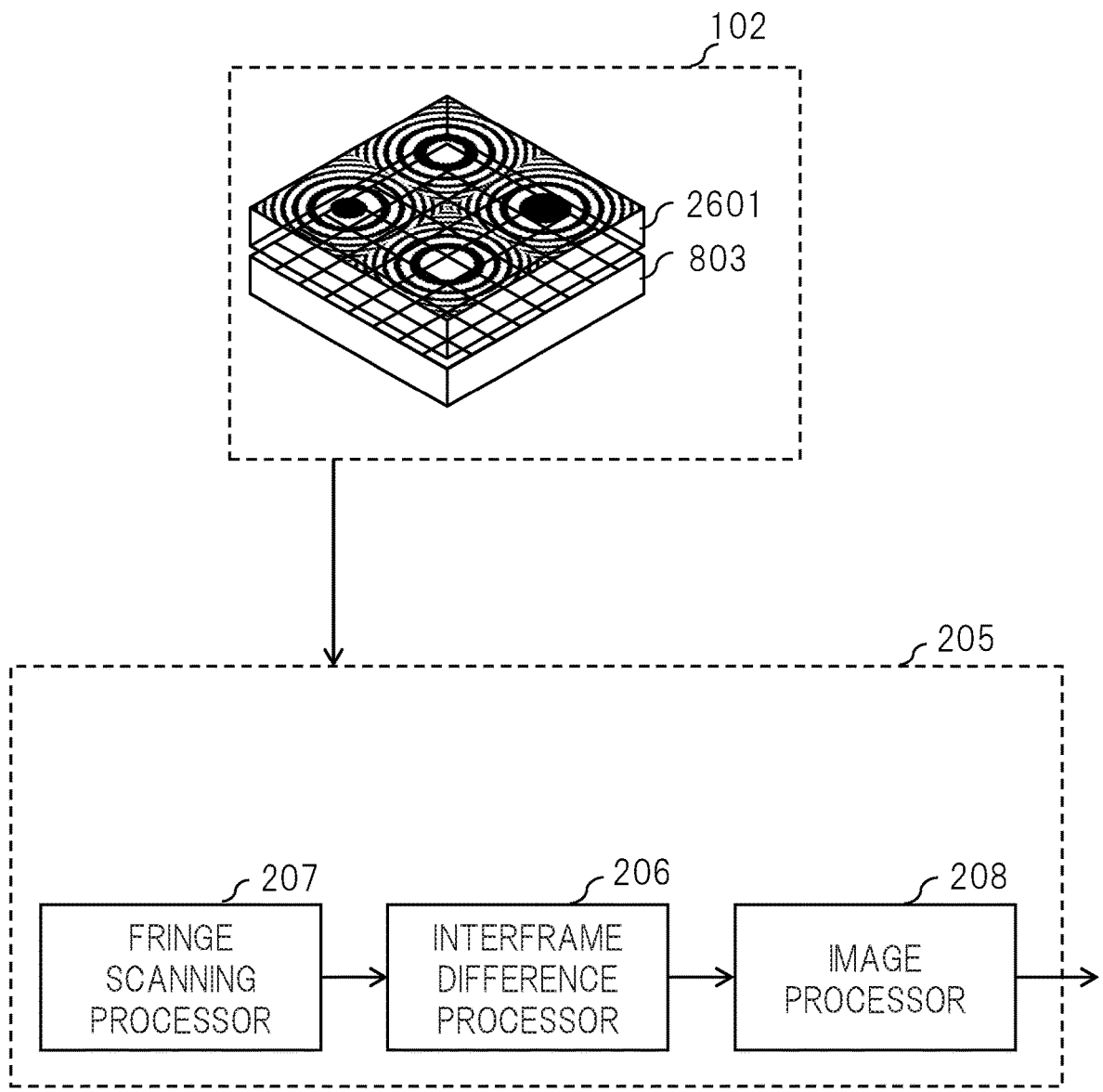
FIG. 29 is a view illustrating another configuration example of the distance measuring sensor and the distance measuring unit according to the first embodiment.

FIG. 29 illustrates the configurations of the distance measuring sensor unit 102 and the distance measuring unit 205 in a case where a fringe scanning process is first executed. A point different from FIG. 26 is only the order of the interframe difference processor 206 and the fringe scanning processor 207, and detailed explanation will thus be omitted.

Figure 30:
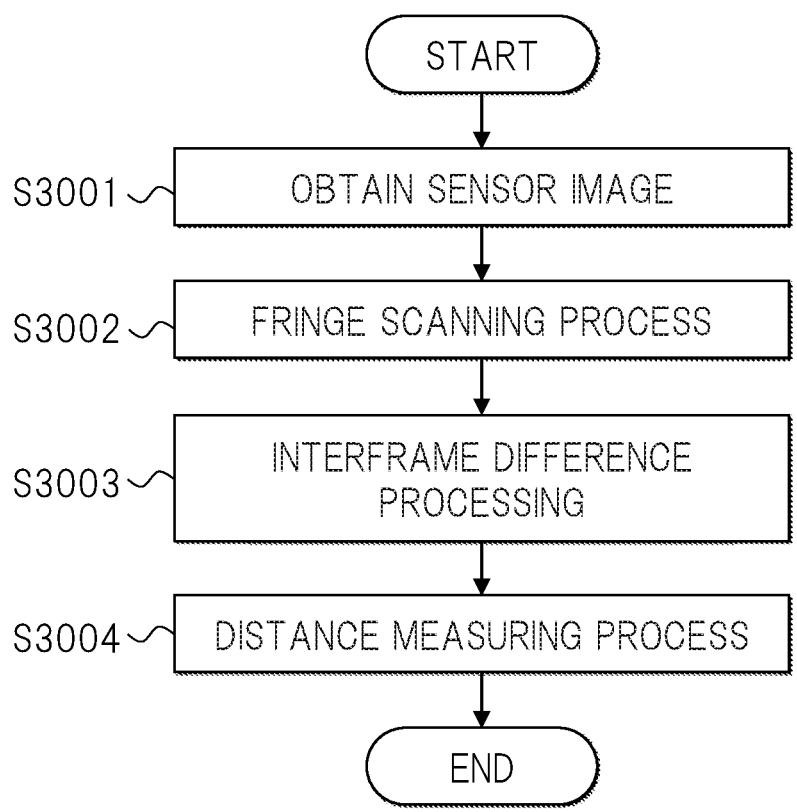
FIG. 30 is a flowchart illustrating another process example of the distance measuring unit.

FIG. 30 is a flowchart illustrating one embodiment of the distance measuring process by the configuration illustrated in FIG. 29. First, the fringe scanning processor 207 obtains a sensor image outputted from the distance measuring sensor unit 102 (S3001), and executes fringe scanning calculation (S3002).

The interframe difference processor 206 generates a difference image from a complex sensor image outputted from the fringe scanning processor 207 (S3003). In the interframe difference processor 206, the images for generating the difference image are changed from the sensor images to the complex sensor images. However, it is possible to realize processes equivalent to those of FIG. 27.

The image processor 208 obtains the difference image outputted from the interframe difference processor 206, and executes a distance measuring process to output distance information (S3004).

By Formula (10), in the fringe scanning calculation, a plurality of sensor images obtained in respective patterns of the initial phases is used as one piece of complex sensor image. For this reason, by first executing the fringe scanning processor 207, it is possible to reduce a calculation amount in the interframe difference processor 206.

Note that in the example described above, the difference image from the image before one frame has been used for the distance measuring process. However, how many frames before the difference image from the image to be taken may be set arbitrarily. For example, in a case where a moving distance of a photographic subject is smaller with respect to a frame rate of a distance measuring sensor, a signal component of the difference image becomes smaller, the distance measurement may not be possible. In such a case, by using a difference image from an image before several frames, it becomes possible to execute accurate distance measurement.

Further, in a case where the moving distance of the photographic subject is larger with respect to the frame rate of the distance measuring sensor, by setting the frame rate of the distance measuring sensor to a high speed, it becomes possible to execute accurate distance measurement.

Figure 31:
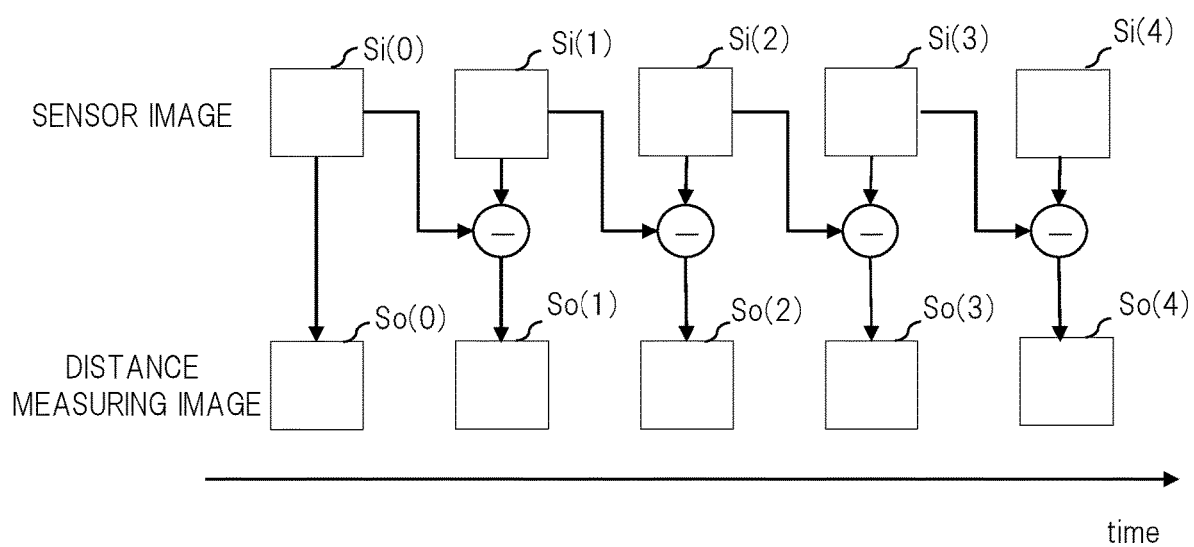
FIG. 31 is a view for explaining a relationship between a sensor image and a distance measuring image.

Further, in a case where the sensor image Si(n−1) is not stored, the interframe difference processor 206 according to the present embodiment outputs the obtained sensor image Si(n) to use it for the distance measuring process. For example, as illustrated in FIG. 31, such a case occurs when the video display apparatus 101 is activated and the first distance measuring process is executed. Further, in a case where storage of the sensor image fails due to an error of a program, or in a case where the stored sensor image disappears, the similar process may be executed.

Figure 32:
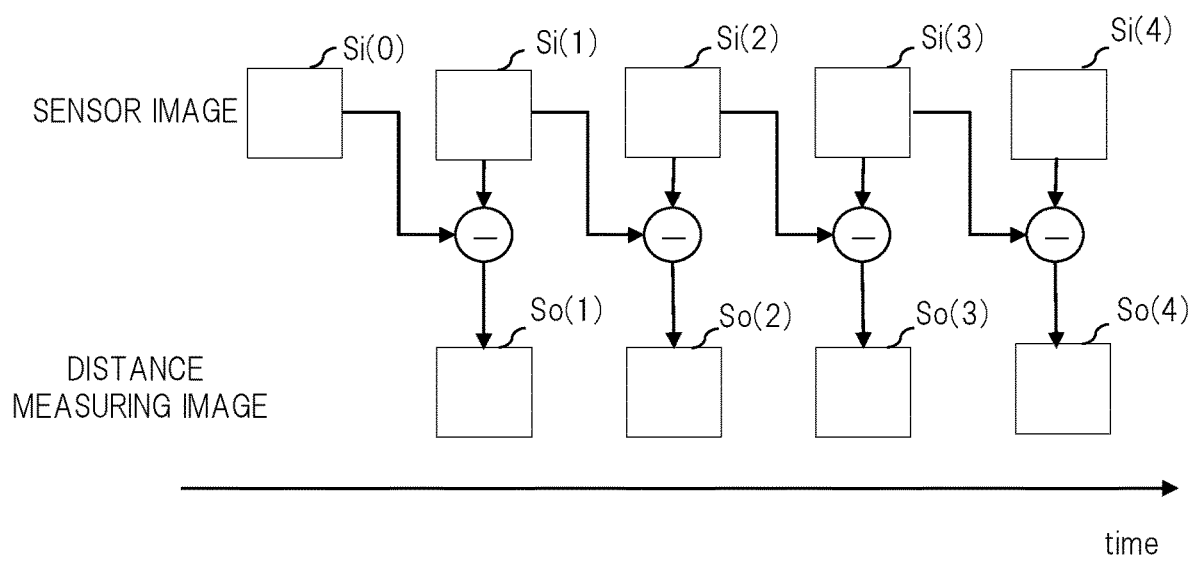
FIG. 32 is a view for explaining a relationship between a sensor image and a distance measuring image.

Note that as illustrated in FIG. 32, in a case where there is no sensor image S(n−1), the distance measuring process may be stopped, and the distance measuring process may be executed from the next sensor image S(n+1).

Figure 33:
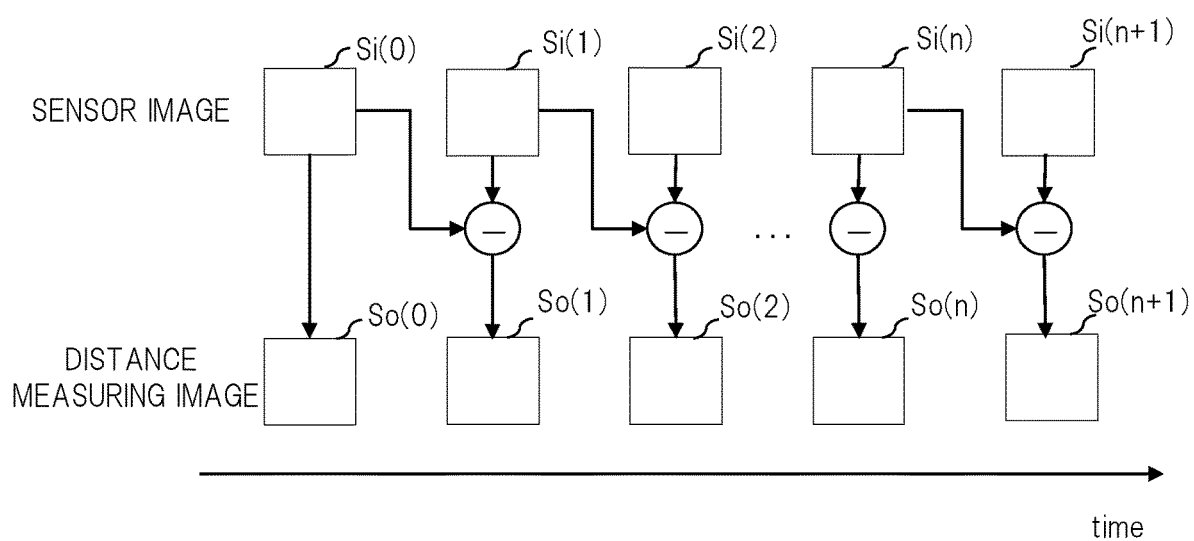
FIG. 33 is a view for explaining a relationship between a sensor image and a distance measuring image.

Further, as illustrated in FIG. 33, the normal sensor image Si(n) may periodically be outputted as a distance measuring image.

In a case where all distance measuring processes are executed by a difference image as illustrated in FIG. 32, it is possible to obtain only distance information of a moving object.

On the other hand, in a case where the distance measuring process is executed using the normal sensor image as illustrated in FIG. 31 or FIG. 33, it is possible to obtain distance information of the entire image. Therefore, it is possible to grasp a shape or the like of the photographic subject. For example, the distance information of the moving object generated using the difference image may be updated with respect to the distance information of the entire image generated using the normal sensor image.

Further, in a case where Si(n−1) is older than a set threshold value, or in a case where a signal component of the difference image is equal to or larger than the set threshold value, the distance measurement using the normal sensor image Si(n) may be executed.

On the contrary, in a case where the signal component of the difference image is equal to or less than the threshold value, the distance measurement using the normal sensor image Si(n) may be executed. Alternatively, previous distance information may be outputted as a result of the distance measurement because there is no motion of the target object.

As described above, the interframe difference processor 206 generates the difference image between the frames of the sensor images, and the image processor 208 generates the distance information indicating the distance to the photographic subject on the basis of the calculation of the difference image and the developing pattern 1101. Thus, the video display apparatus 101 generates the difference image between the frames of the sensor images. Therefore, it becomes possible to realize the distance measuring apparatus capable of reducing an influence of a background and generating highly accurate distance information.

Second Embodiment

A different point between the present embodiment and the first embodiment is that a distance measuring sensor unit and a distance measuring unit are mounted on another apparatus.

Figure 34:
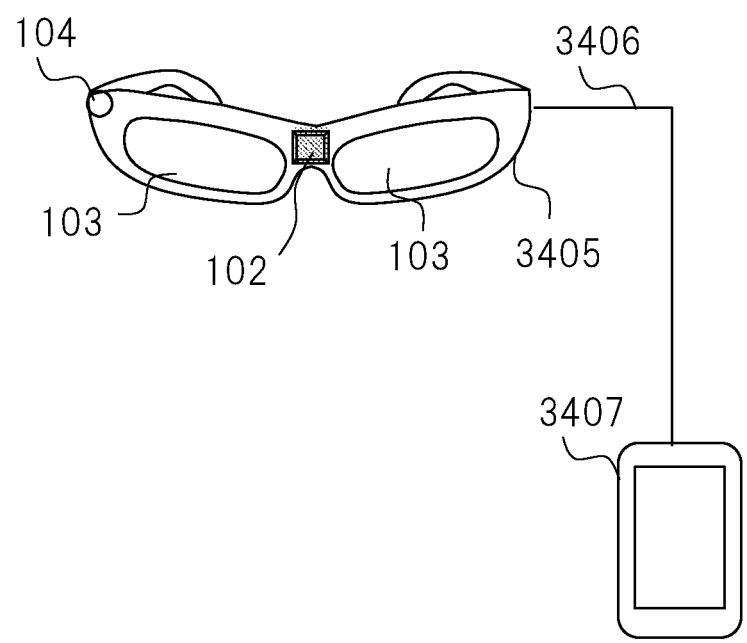
FIG. 34 is a schematic view of a head mounted video display apparatus on which a distance measuring apparatus according to a second embodiment is mounted and a calculating unit.

FIG. 34 is a schematic view of a configuration of a distance measuring system that includes a head mounted video display apparatus 3405 and a calculating unit 3407. The video display apparatus 3405 (an imaging device) equipped with a video displaying function and an imaging function is connected to the calculating unit 3407 equipped with a calculating function via a communication line 3406. The calculating unit 3407 is a device that receives an image taken by the video display apparatus 3405 via the communication line 3406 described above and measures a distance to a photographic subject by using the image. Namely, the video display apparatus 3405 is an apparatus connected to the calculating unit that measures the distance to the photographic subject on the basis of an obtained image.

Figure 35:
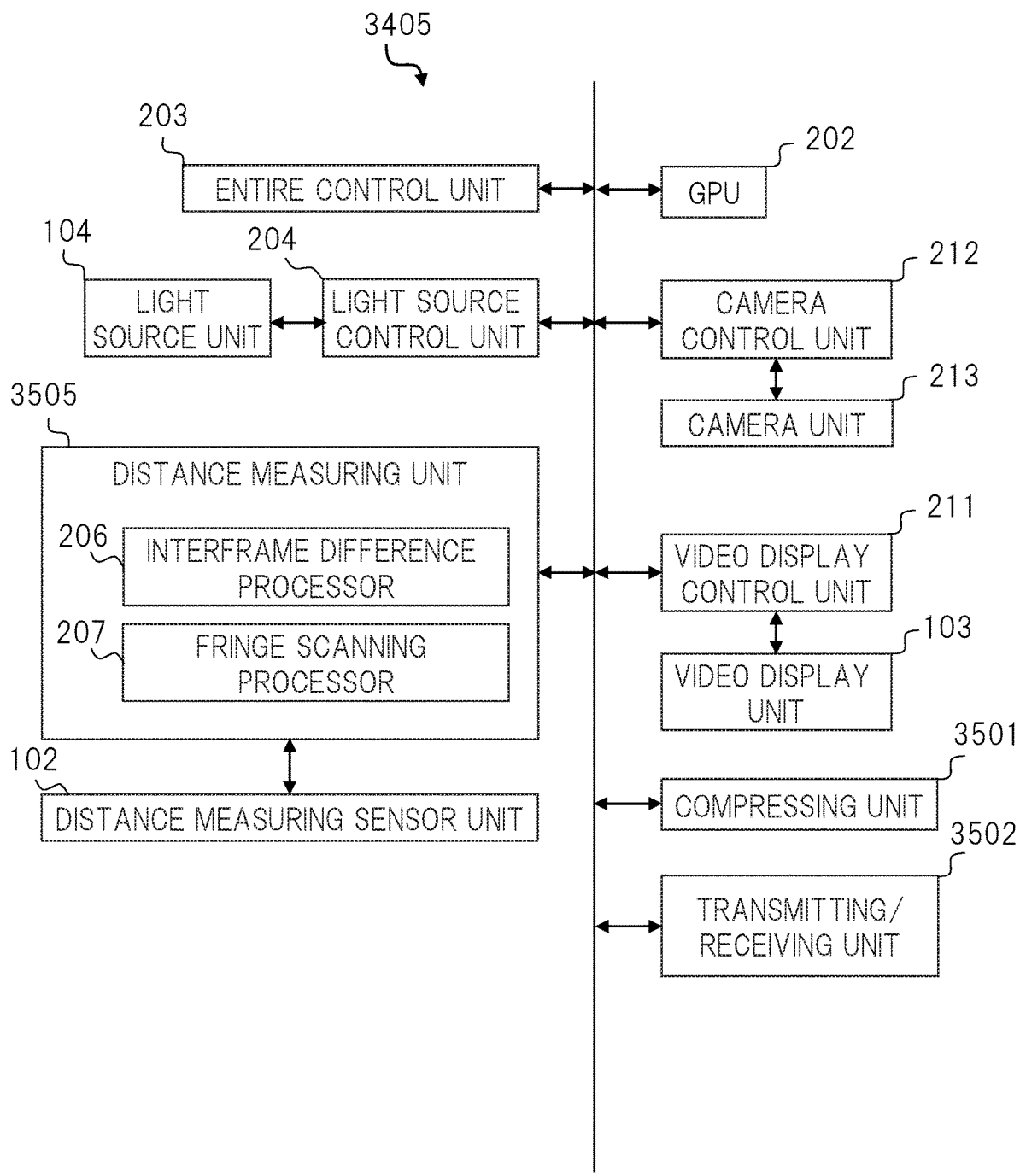
FIG. 35 is a view illustrating a configuration example of the video display apparatus in the second embodiment.
Figure 36:
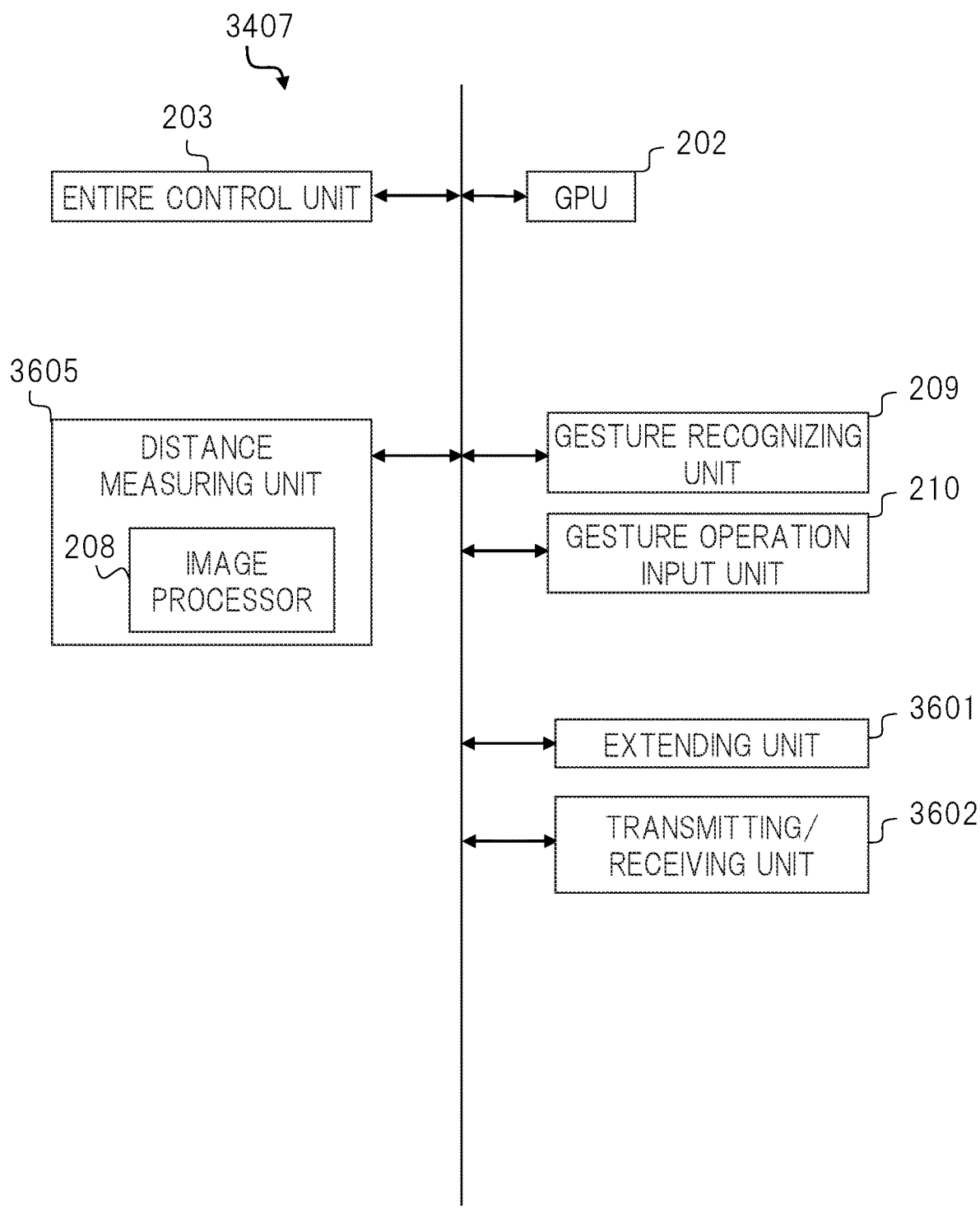
FIG. 36 is a view illustrating a configuration example of the calculating unit in the second embodiment.

FIG. 35 is a block diagram illustrating one embodiment of the video display apparatus 3405 to be worn on a head. FIG. 36 is a block diagram illustrating one embodiment of the calculating unit 3407. By dividing functions and mounting the divided functions on another apparatus, it is possible to reduce the size and weight of the apparatus portion worn on the head. Further, communication between the video display apparatus 3405 and the calculating unit 3407 may be wired communication or wireless communication. In case of the wireless communication, a communication line connecting the video display apparatus 3405 to the calculating unit 3407 is not required, a user can carry out the work without worrying about existence of the communication line. This makes it possible to improve usability thereof.

A configuration illustrated in FIG. 35 will be described. A compressing unit 3501 compresses data when the data are transmitted to the calculating unit 3407. A transmitting/receiving unit 3502 (a data transmitting unit) transmits and receives data to and from the calculating unit 3407.

A configuration illustrated in FIG. 36 will be described. A transmitting/receiving unit 3602 (a data receiving unit) transmits and receives data to and from the video display apparatus 3405. An extending unit 3601 extends compressed information received by the transmitting/receiving unit 3602 to restore the original data.

In the present embodiment, by mounting the processes executed by the distance measuring unit 205 illustrated in FIG. 2 on separate apparatuses including the video display apparatus 3405 and the calculating unit 3407, the processes are divided.

On a side of the video display apparatus 3405 illustrated in FIG. 35, a distance measuring unit 3505 transmits an image from the distance measuring sensor unit 102, which is obtained by executing a fringe scanning process and interframe difference processing.

On a side of the calculating unit 3407 illustrated in FIG. 36, a distance measuring unit 3605 executes image processing by using the image to generate distance information.

By Formula (10), in the fringe scanning calculation, a plurality of sensor images obtained in respective patterns of initial phases is used as one piece of complex sensor image. For this reason, by mounting the fringe scanning processor 207 on the video display apparatus 3405 side, it is possible to reduce the amount of data compared with a case where a normal sensor image is transmitted.

Figure 37:
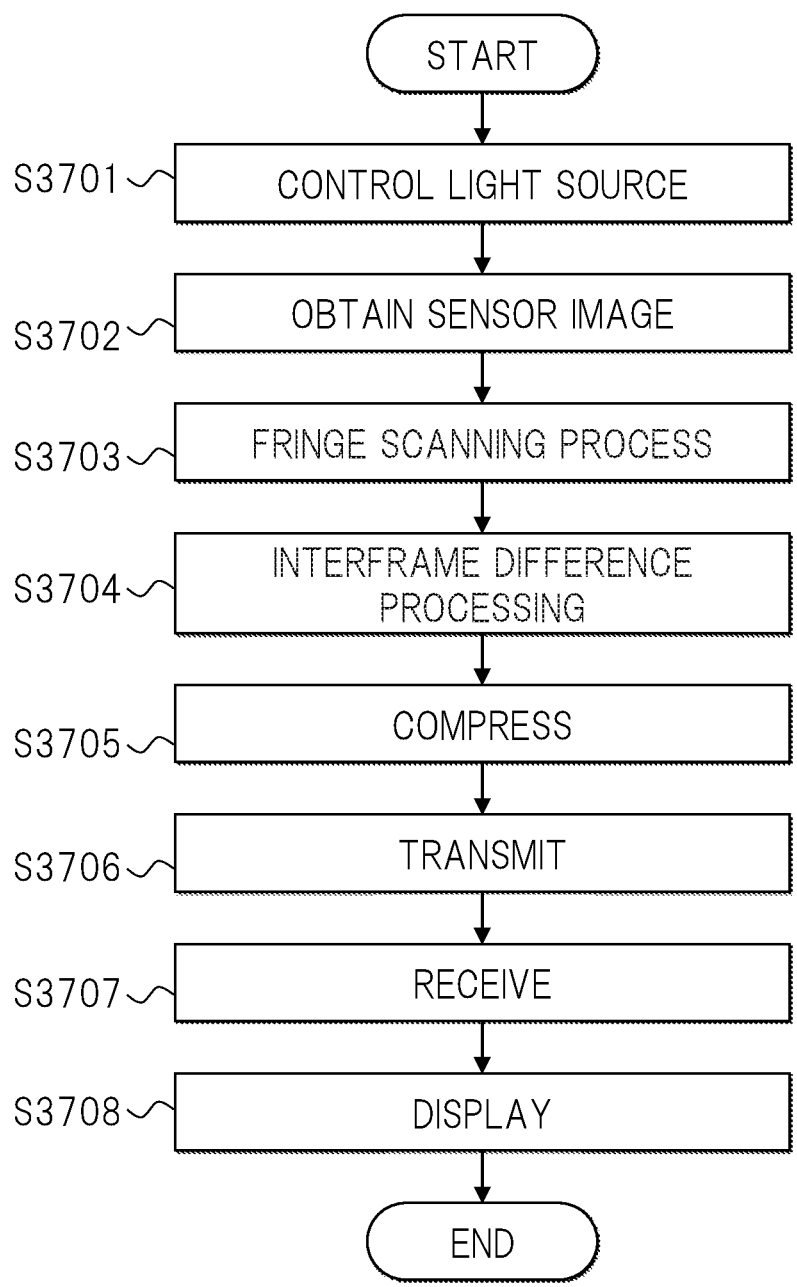
FIG. 37 is a flowchart illustrating one embodiment of a process of the video display apparatus in the second embodiment.
Figure 38:
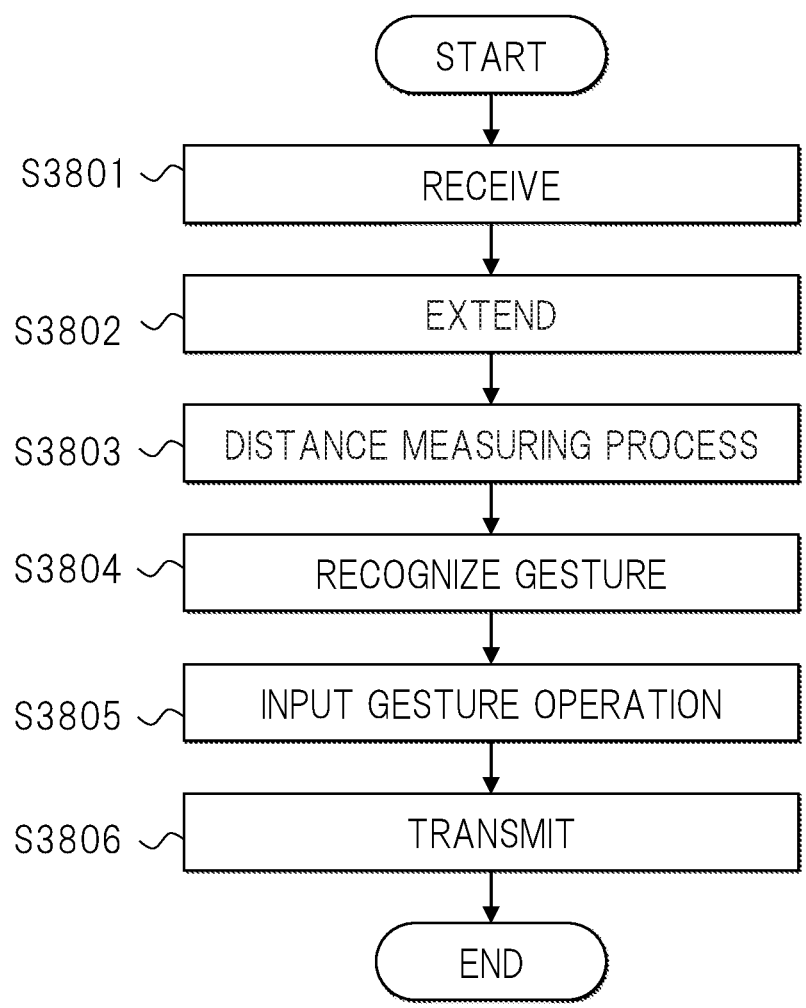
FIG. 38 is a flowchart illustrating one embodiment of a process of the calculating unit in the second embodiment.

Processing flows of the video display apparatus 3405 and the calculating unit 3407 respectively illustrated in FIG. 35 and FIG. 36 will be described with reference to FIG. 37 and FIG. 38.

The processing flow of the video display apparatus illustrated in FIG. 37 will be described. An entire control unit 203 controls this whole flow.

First, the light source control unit 204 controls the light source unit 104, thereby adjusting an amount of light to be irradiated (S3701).

Next, the fringe scanning processor 207 obtains a sensor image from the distance measuring sensor unit 102 (S3702), and executes fringe scanning calculation to generate a complex sensor image (S3703). Then, the interframe difference processor 206 generates a difference image of complex sensor images, and outputs it as a distance measuring image (S3704).

Subsequently, the compressing unit 3501 obtains the distance measuring image outputted from the interframe difference processor 206 to compress it (S3705). The transmitting/receiving unit 3502 transmits the compressed data are to the calculating unit 3407 (S3706).

Finally, the transmitting/receiving unit 3502 receives the data transmitted from the calculating unit 3407 (S3707), and the video display control unit 211 causes the video display unit 103 to display it on the basis of the received information (S3708).

The processing flow of the calculating unit illustrated in FIG. 38 will be described. The entire control unit 203 controls this whole flow.

First, the transmitting/receiving unit 3602 receives the compressed data transmitted from the video display apparatus 3405 (S3801), and the extending unit 3601 extends the compressed data (S3802).

Subsequently, the distance measuring unit 3605 executes a distance measuring process for the extended data, that is, the image obtained by the distance measuring sensor unit 102 using the image subjected to a fringe scanning process and interframe difference processing, and generates distance information (S3803). The gesture recognizing unit 209 executes gesture recognition by using the distance information obtained from the distance measuring unit 3605 (S3804), and receives a gesture recognition result as an input operation by inputting it to the gesture operation input unit 210 (S3805).

Finally, the transmitting/receiving unit 3602 transmits a response according to the input operation (S3806).

By dividing functions and mounting the divided functions on another apparatus, the process to transmit and receive the data is required, and as a result, processing delay may occur. However, by compressing data to be transmitted and received, it becomes possible to minimize the processing delay.

Note that the interframe difference processor 206 or the fringe scanning processor 207 may be mounted on the calculating unit 3407 side. In this case, since a calculation amount in the video display apparatus 3405 can be reduced, it is possible to realize miniaturization and low cost of the video display apparatus 3405.

Third Embodiment

Figure 39:
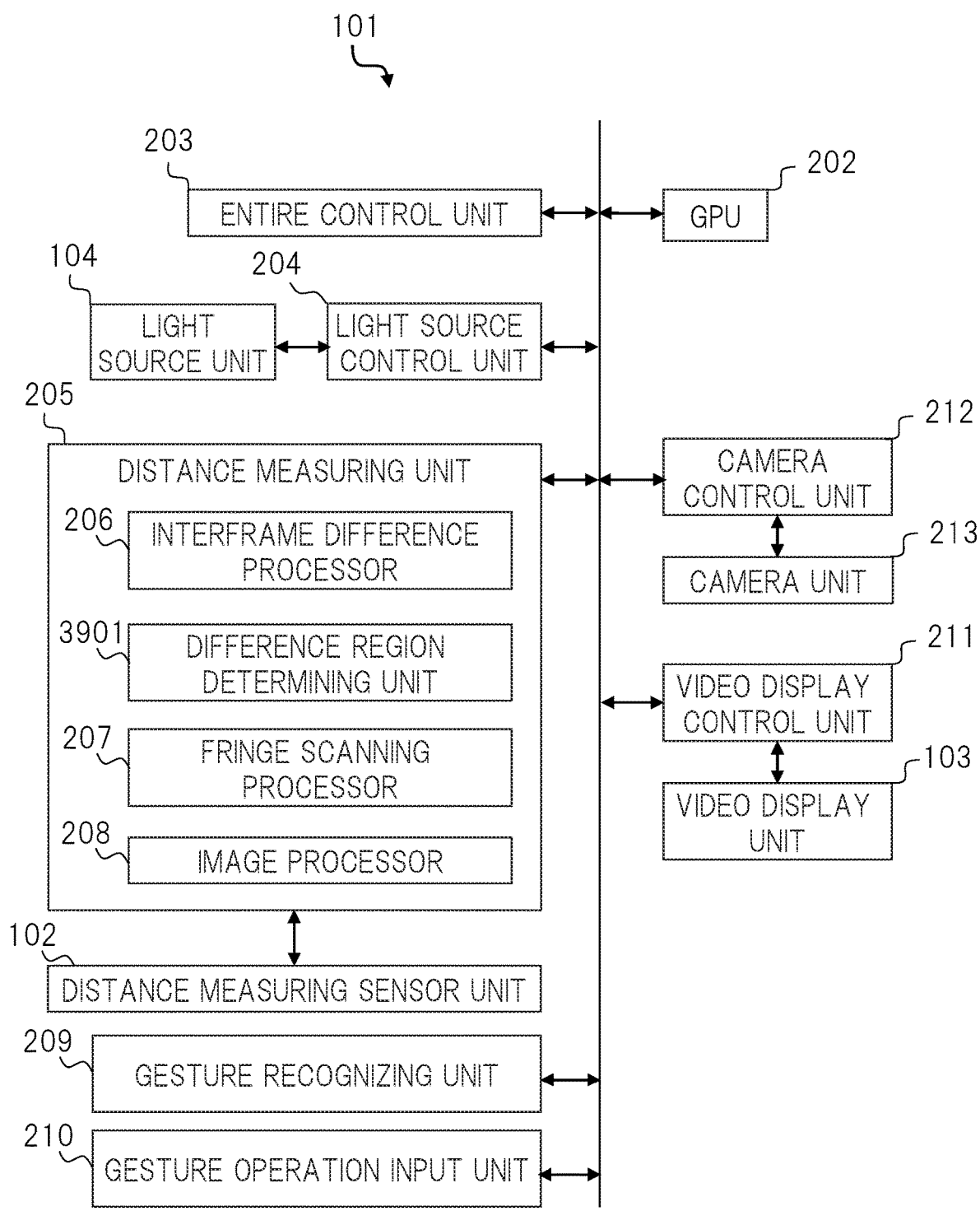
FIG. 39 is a schematic view of a head mounted video display apparatus on which a distance measuring apparatus according to a third embodiment is mounted.

FIG. 39 illustrates one embodiment of a configuration of a video display apparatus according to the present embodiment. A difference from the configuration of the video display apparatus according to the first embodiment illustrated in FIG. 2 is that a difference region determining unit 3901 (a difference image region determining unit) is added to the distance measuring unit 205. This difference region determining unit 3901 is a part that determines an image region for which a difference is to be taken by the interframe difference processor 206.

Figure 40:
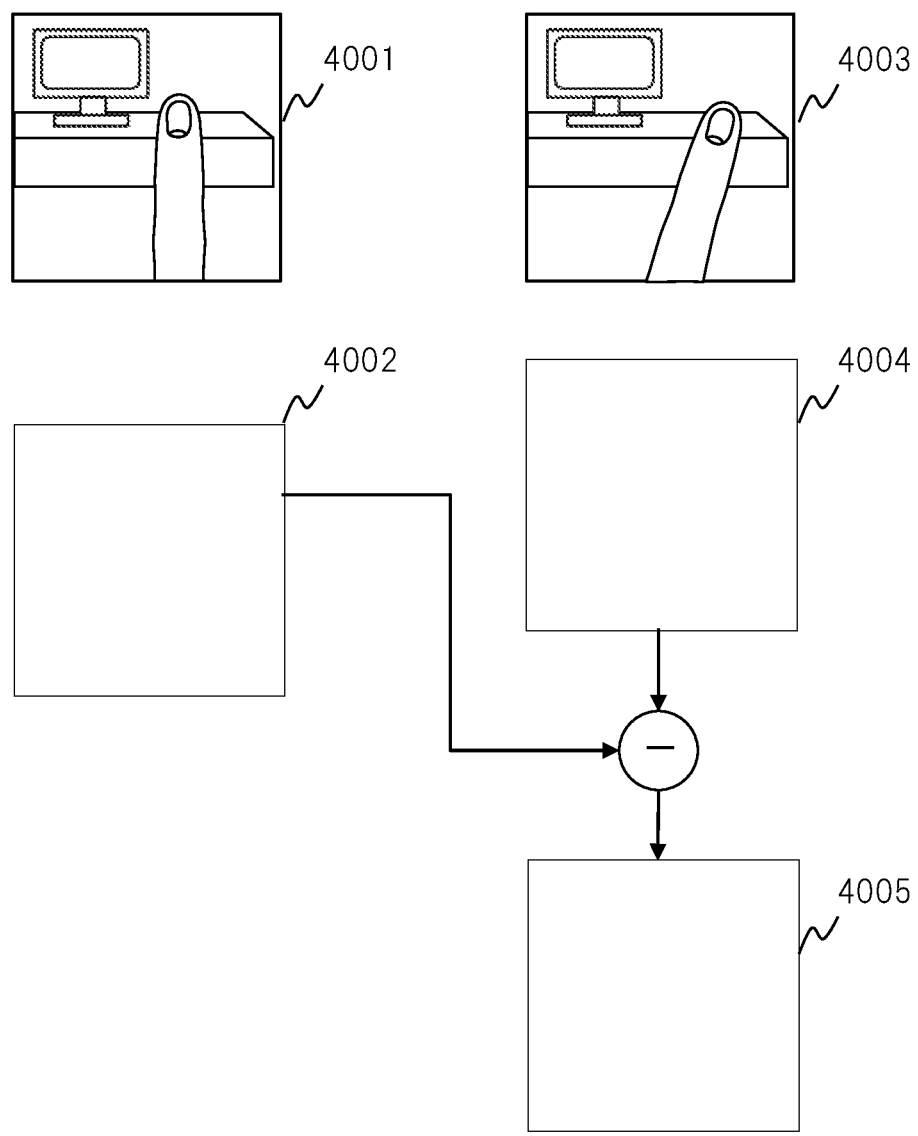
FIG. 40 is a view for explaining a positional relationship of a photographic subject with respect to a sensor image when a wearer of the head mounted video display apparatus on which the distance measuring apparatus is mounted moves.

A problem when a distance measuring apparatus according to the present invention is mounted on a head mounted video display apparatus and used will be described with reference to FIG. 40 and FIG. 41.

A photographic subject 4001 is a photographic subject at n=k−1, and a sensor image 4002 is a sensor image Si(k−1) that is outputted when an image of the photographic subject 4001 is taken by the distance measuring sensor unit 102. Further, a photographic subject 4003 is a photographic subject at n=k, and a sensor image 4004 is a sensor image Si(k) that is outputted when an image of the photographic subject 4003 is taken by the distance measuring sensor unit 102.

A difference image 4005 is a difference image So(k) between the Si(k) and the Si(k−1).

In this case, since information other than a hand portion moved by the photographic subject is excluded from the So(k), the video display apparatus 101 can generate accurate distance information on the hand portion.

Figure 41:
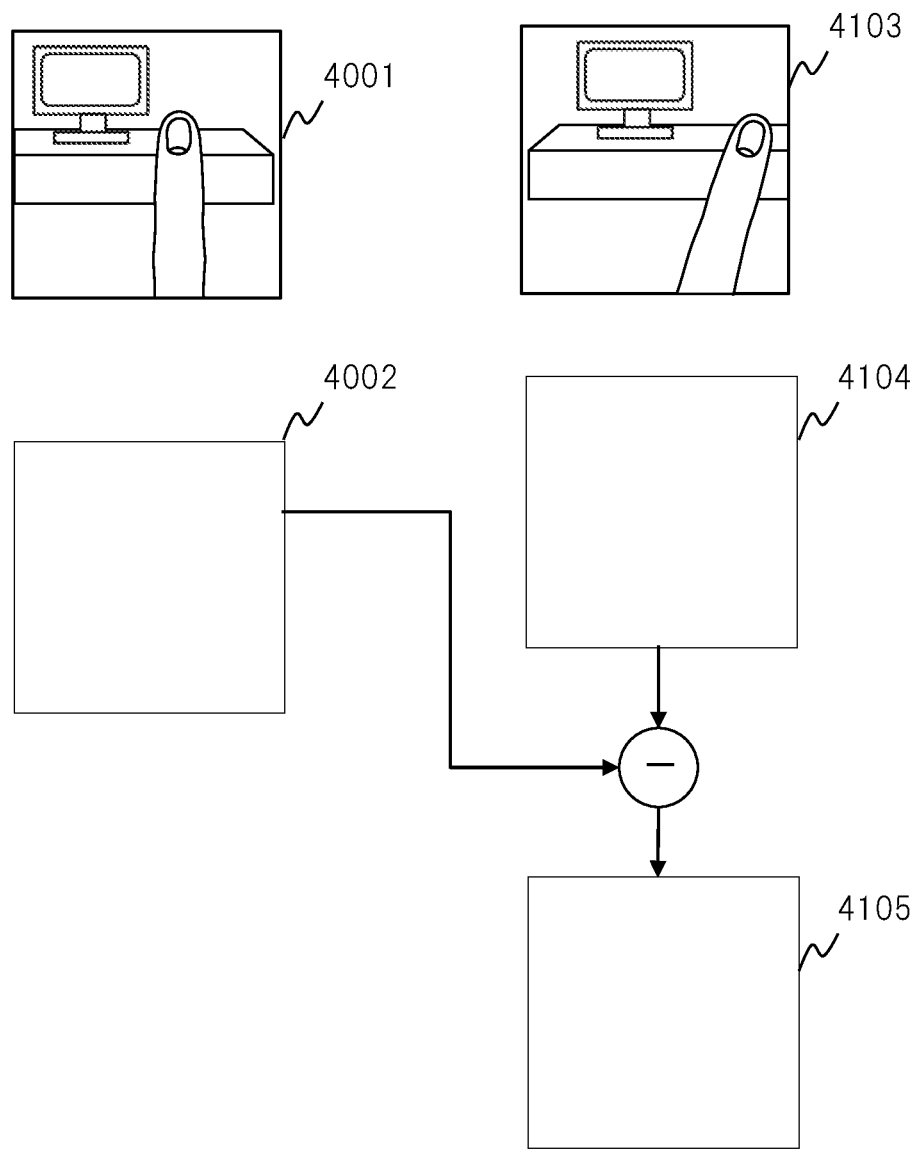
FIG. 41 is a view for explaining a positional relationship of the photographic subject with respect to the sensor image when the wearer of the head mounted video display apparatus on which the distance measuring apparatus is mounted moves.

FIG. 41 is an example of a case where a wearer of the video display apparatus moves his or her head at the time of n=k. A photographic subject 4103 is a photographic subject viewed from a position of the wearer (a distance measuring sensor) after the head is moved, and a positional relationship of the entire image including a background changes.

In this case, the entire positional relationship between a sensor image (4104), which is outputted when an image of the photographic subject 4103 is taken by the distance measuring sensor unit 102, and a difference image (4105) of the sensor image 4002 is out of alignment. For this reason, information on the background cannot be excluded, and accurate distance measurement cannot thus be executed.

As described above, in a case where the positional relationship between the distance measuring sensor and the photographic subject changes such as the wearer moving his or her head, the problem is that the information on the background cannot be excluded even though the difference image is used, and the accurate distance measurement cannot be executed.

In the present embodiment, a method of solving the problem by obtaining movement information of the distance measuring sensor from cross correlation of the sensor images obtained by the distance measuring sensor unit 102 will be described.

First, an outline of the method of solving the problem according to the present embodiment will be described with reference to FIG. 42.

Figure 42:
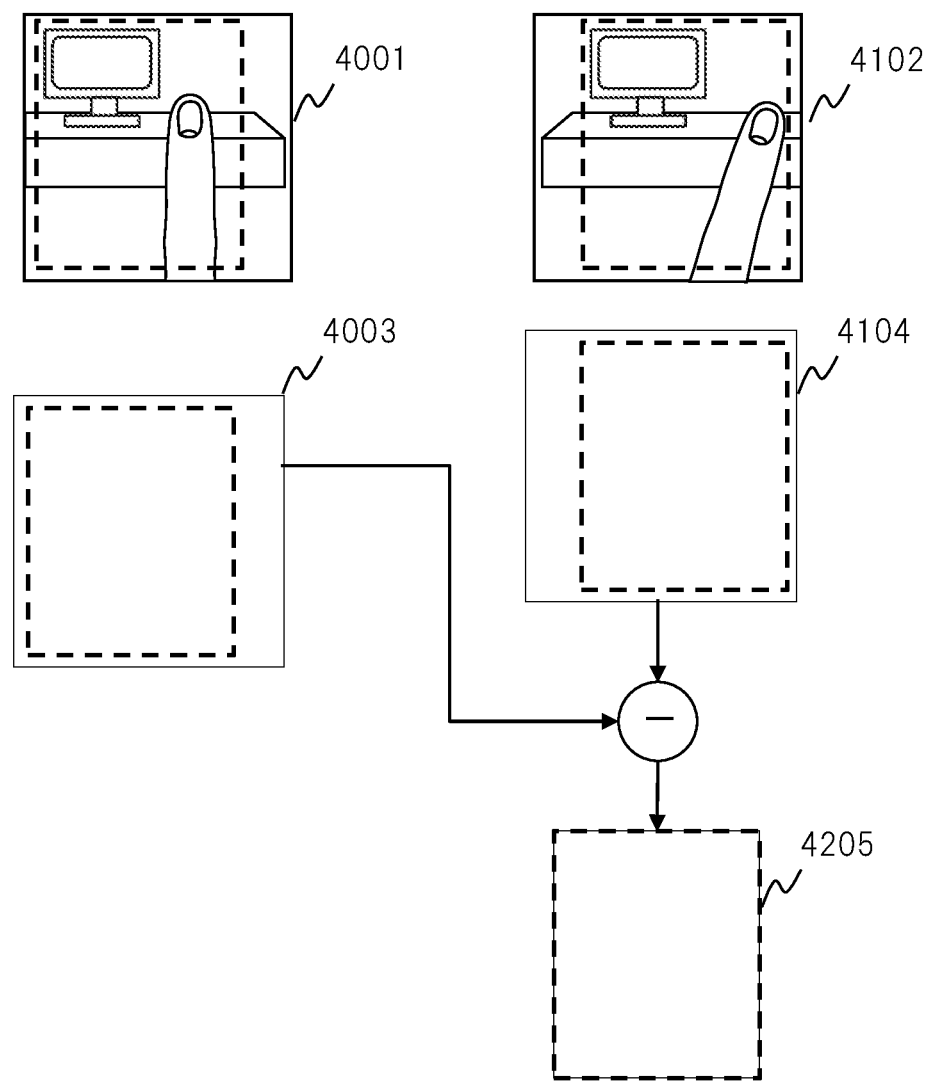
FIG. 42 is a view for explaining a positional relationship of the photographic subject with respect to the sensor image when the wearer of the head mounted video display apparatus on which the distance measuring apparatus is mounted moves.

A positional relationship between a photographic subject and a distance measuring sensor in FIG. 42 is the same as that illustrated in FIG. 41. A region surrounded by a dotted line in FIG. 42 represents a region used for a difference image.

If the positional relationship between the background and the photographic subject is the same in the region used for the difference image, a difference image 4205 in the region excludes information other than the hand portion moved by the photographic subject, and this makes it possible to generate accurate distance information on the hand portion of the photographic subject.

At this time, the difference region determining unit 3901 determines the region in which the positional relationship between the background and the photographic subject is the same.

Figure 43:
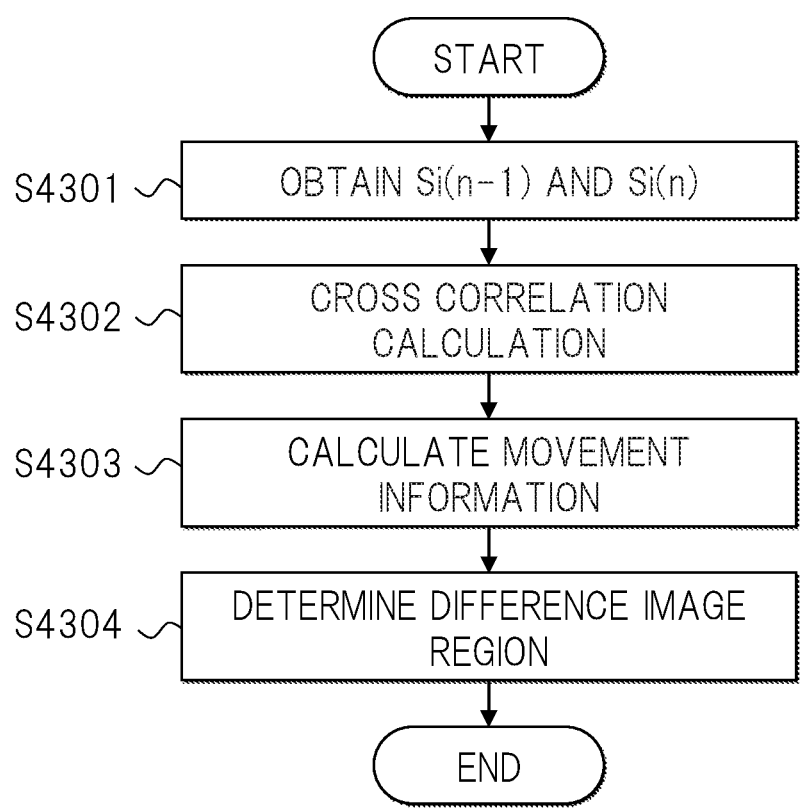
FIG. 43 is a flowchart illustrating one embodiment of a processing flow by a difference image region determining unit according to the third embodiment.

FIG. 43 is one embodiment of a processing flow by the difference region determining unit 3901. First, the difference region determining unit 3901 obtains sensor images Si(n−1) and Si(n) from the interframe difference processor 206 (S4301) to calculate a cross correlation function (S4302).

Next, movement information of the distance measuring sensor unit 102 is obtained using a calculation result of the cross correlation function (S4303). The sensor image outputted from the distance measuring sensor unit 102 is a projection image of the photographing pattern 405. The photographing pattern 405 shifts depending upon an angle at which a light source enters. For that reason, if an angle of a target object with respect to the distance measuring sensor unit 102 changes due to the wearer moving his or her head, the pattern to be projected also moves. The amount of movement is obtained from the cross correlation.

FIG. 44 is a calculation result of the cross correlation function between the Si(n−1) and the Si(n). A peak of the cross correlation function appears in accordance with a moving direction of the pattern to be projected. Therefore, for example, in a case where the Si(n) moves by Δx and Δy as a whole with respect to the Si(n−1) due to movement of the wearer, the peak of the cross correlation function appears at a position moved by Δx and Δy from the center. This makes it possible to obtain a moving amount from the position where the peak of the cross correlation function appears.

Finally, a region where the positional relationship between the background and the photographic subject is the same is determined from the movement information of the distance measuring sensor (S4304).

Note that since the photographing pattern 405 is projected onto the entire sensor, it is possible to obtain the moving amount even by cutting out a partial region of the sensor images Si(n−1) and Si(n) and calculating the cross correlation function. FIG. 44 is a result obtained by cutting out a lower left region (4401 and 4402) when each of the Si(n−1) and the Si(n) is divided into 2×2 regions, and calculating the cross correlation function. In FIG. 45, it is possible to obtain a peak of the cross correlation function at the similar position (Δx, Δy) to that illustrated in FIG. 44.

Thus, by cutting out the partial region and calculating the cross correlation function, it is possible to reduce a calculation amount.

Figure 46:
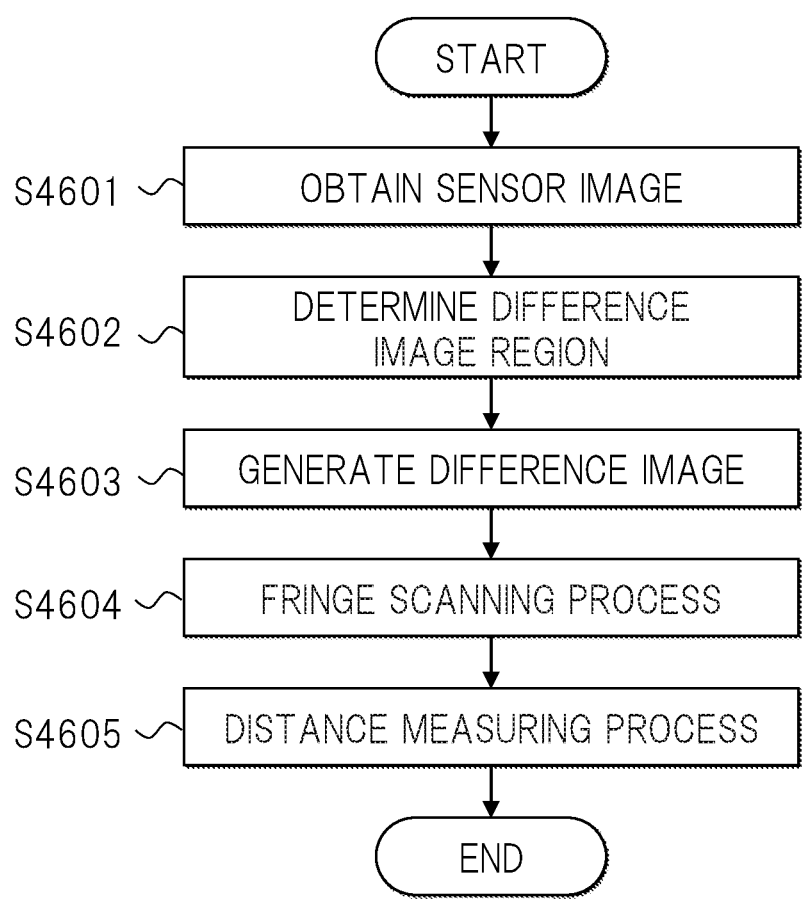
FIG. 46 is a flowchart illustrating one embodiment of a distance measuring process according to the third embodiment.

FIG. 46 is one embodiment of a processing flow of distance measurement according to the present embodiment. First, the interframe difference processor 206 obtains a sensor image outputted from the distance measuring sensor unit 102 (S4601). Then, the difference region determining unit 3901 obtains sensor images Si(n−1) and Si(n) from the interframe difference processor 206 to determine a difference image region (S4602). The interframe difference processor 206 cuts out the determined difference image region from the Si(n−1) and the Si(n) on the basis of the difference image region to generate a difference image (S4603). Thus, the difference region determining unit 3901 calculates a cross correlation function between frames by using a partial region in the sensor image to determine an image region. The interframe difference processor 206 generates the difference image between the frames in the image region determined by the difference region determining unit 3901.

The fringe scanning processor 207 obtains the difference image, and executes fringe scanning calculation to generate a complex sensor image (S4604). Finally, the image processor 208 executes distance measurement using the complex sensor image, and generates distance information (S4605).

Note that in a case where the peak of the cross correlation function between the sensor images Si(n−1) and Si(n) is smaller than a set threshold value in the difference region determining unit 3901, there is a possibility that the wearer moves his or her head as the photographic subject is out of an imaging range of the distance measuring sensor. Therefore, the video display apparatus 101 may execute a distance measuring process by the Si(n) without using the difference image, or may stop the distance measuring process.

Further, the same also applies to a case where the difference image region determined by the difference region determining unit 3901 is narrower than a set threshold value.

The configuration and method described above allows the distance measurement corresponding to a motion of the wearer even in a case where the distance measuring sensor is mounted on the head mounted video display apparatus.

Fourth Embodiment

FIG. 47 is one embodiment of a configuration of a video display apparatus according to the present embodiment. A difference from the configuration illustrated in FIG. 39 is that a sensor unit 4701 and a posture detecting unit 4702 are added.

In the third embodiment, the difference image region has been determined from the cross correlation of the sensor images outputted from the distance measuring sensor unit 102. However, in the present embodiment, the posture detecting unit 4702 detects posture of a wearer using information obtained by the sensor unit 4701, and determines a region of a difference image.

The sensor unit 4701 is an acceleration sensor, a direction sensor, or the like, for example, and is capable of sensing a motion of the video display apparatus 101. By using a dedicated sensor for detecting the posture of the wearer, it is possible to speed up processes and reduce a calculation amount.

Specifically, the sensor unit 4701 senses motion information of the video display apparatus 101, and sends out the motion information to the posture detecting unit 4702. The posture detecting unit 4702 generates movement information (information indicating a moving direction and a moving speed) of the video display apparatus 101 from the motion information. The posture detecting unit 4702 sends out the movement information to the distance measuring unit 205. The difference region determining unit 3901 of the distance measuring unit 205 determines a region of a difference image on the basis of the movement information.

Further, the interframe difference processor 206 may be configured to determine whether a difference image between frames is generated on the basis of the movement information or not. For example, in a case where the movement information indicates that a moving amount is large, the interframe difference processor 206 determines that it is meaningless to take a difference from an immediately preceding image.

Note that the present invention is not limited to the embodiments described above, and various modifications are contained. For example, the embodiments described above have been explained in detail for explaining the present invention clearly. The present invention is not necessarily limited to one that includes all configurations that have been explained.

Further, a part of the configuration of one embodiment can be replaced by a configuration of the other embodiment. Further, a configuration of the other embodiment can be added to a configuration of one embodiment.

Further, a part of the configuration of each of the embodiments can be added to the other configuration, deleted or replaced thereby.

Further, a part or all of the respective configuration described above, the functions, processing units, and processing means may be realized by hardware that is designed by an integrated circuit, for example. Further, the respective configuration described above and the functions may be realized by software so that a processor interprets programs realizing the respective functions and execute the interpreted programs. Information on programs, tables, and files, which realize the respective functions, can be placed in a recording device such as a memory, a hard disk, or an SSD (Solid State Drive), or a recording medium such as an IC card, an SD card, or a DVD.

Further, control lines and information lines are illustrated so long as they are thought to be necessary for explanation. All of the control lines and the information line are not necessarily illustrated on a product. In fact, it may be considered that almost all of the components are connected to each other.

REFERENCE SINGS LIST

101 . . . video display apparatus, 102 . . . distance measuring sensor unit, 103 . . . video display unit, 104 . . . light source unit, 201 . . . CPU, 202 . . . GPU, 203 . . . entire control unit, 204 . . . light source control unit, 205 . . . distance measuring unit, 206 . . . interframe difference processor, 207 . . . fringe scanning processor, 208 . . . image processor, 209 . . . gesture recognizing unit, 210 . . . gesture operation input unit, 212 . . . camera control unit, 213 . . . camera unit, and 214 . . . video display control unit.

The invention claimed is:

1. A distance measuring apparatus configured to measure a distance to a photographic subject, the distance measuring apparatus comprising:
   an optical modulator configured to modulate intensity of light on a basis of a first grid pattern;
   an image sensor configured to convert light transmitted through the optical modulator into an electric signal to generate a sensor image based on the photographic subject;
   an interframe difference processor configured to generate a difference image which shows a difference between frames of the sensor image;
   an image processor configured to generate distance information on a basis of calculation of the difference image and data of a second grid pattern, the distance information indicating the distance to the photographic subject;
   a motion sensor configured to sense motion information of the distance measuring apparatus; and
   a posture detecting circuit configured to generate movement information of the distance measuring apparatus between the frames from the sensed motion information,
   wherein the interframe difference processor is configured to determine whether the difference image which shows the difference between the frames is generated or not on a basis of the generated movement information,
   wherein the interframe difference processor is configured to output the sensor image in a case where it is determined that the difference image is not generated, and
   wherein the image processor is configured to generate the distance information on the basis of the calculation of the sensor image and the data of the second grid pattern.

2. The distance measuring apparatus according to claim 1, further comprising:
   a complex sensor image processor configured to generate a complex sensor image from the sensor image, the complex sensor image having a complex number,
   wherein the interframe difference processor is configured to generate a difference image which shows a difference between frames of the complex sensor image, and
   wherein the image processor is configured to generate the distance information on the basis of the calculation of the difference image and the data of the second grid pattern.

3. The distance measuring apparatus according to claim 1,
   wherein the interframe difference processor is configured to determine whether a difference image which shows a difference between frames is to be generated or not on a basis of a storage situation of the sensor image between the frames, wherein in a case where it is determined that no difference image is generated, the interframe difference processor is configured to output the sensor image, and wherein the image processor is configured to generate the distance information on the basis of the calculation of the sensor image and the data of the second grid pattern.

4. The distance measuring apparatus according to claim 1, further comprising:

a difference image region determining circuit configured to determine an image region for which a difference is to be taken by the interframe difference processor, wherein the interframe difference processor is configured to generate the difference image which shows the difference between the frames in the image region determined by the difference image region determining circuit.

5. The distance measuring apparatus according to claim 4, wherein the difference image region determining circuit is configured to calculate a cross correlation function between frames in the sensor image to determine the image region.

6. The distance measuring apparatus according to claim 4, wherein the difference image region determining circuit is configured to calculate a cross correlation function between frames using a partial region in the sensor image to determine the image region.

7. The distance measuring apparatus according to claim 4, wherein the difference image region determining circuit is configured to determine the image region using the movement information.

8. A distance measuring system comprising an imaging device, a calculating unit, a motion sensor, and a posture detecting circuit, wherein the imaging device includes:
an optical modulator configured to modulate intensity of light using a first grid pattern, the light transmitting through the first grid pattern;
an image sensor configured to convert the light transmitted through the optical modulator into an electric signal to generate a sensor image;
an interframe difference processor configured to generate a difference image which shows a difference between frames of the sensor image; and
a data transmitting unit configured to transmit the difference image to the calculating unit, wherein the calculating unit includes:
a data receiving unit configured to receive the difference image from the imaging device; and
an image processor configured to generate distance information on a basis of calculation of the difference image received by the data receiving unit and data of a second grid pattern, wherein the motion sensor is configured to sense motion information of the distance measuring system; and wherein the posture detecting circuit is configured to generate movement information of the distance measuring system between the frames from the sensed motion information, wherein the interframe difference processor is configured to determine whether the difference image which shows the difference between the frames is generated or not on a basis of the generated movement information, wherein the interframe difference processor is configured to output the sensor image in a case where it is determined that the difference image is not generated, and wherein the image processor is configured to generate the distance information on the basis of the calculation of the sensor image and the data of the second grid pattern.

9. A distance measuring method executed by a distance measuring apparatus configured to measure a distance to a photographic subject, the distance measuring method comprising:

a modulating step of modulating intensity of light on a basis of a first grid pattern by a modulator included in the distance measuring apparatus;

an image generating step of converting light transmitted through the modulator into an electric signal to generate a sensor image based on the photographic subject;

an interframe difference processing of generating a difference image which shows a difference between frames of the sensor image;

an image processing step of generating distance information on a basis of calculation of the difference image and data of a second grid pattern;

a motion sensing step of sensing motion information of the distance measuring apparatus; and a posture detecting step of generating movement information of the distance measuring apparatus between the frames from the sensed motion information, wherein the interframe difference processing step includes determining whether the difference image which shows the difference between the frames is generated or not on a basis of the generated movement information, wherein the interframe difference processing step further includes outputting the sensor image in a case where it is determined that the difference image is not generated, and wherein the image processing step includes generating the distance information on the basis of the calculation of the sensor image and the data of the second grid pattern.

10. The distance measuring method according to claim 9, further comprising:

a complex sensor image processing step of generating a complex sensor image from the sensor image, the complex sensor image having a complex number, wherein in the interframe difference processing step, a difference image which shows a difference between frames of the complex sensor image is generated, and wherein in the image processing step, the distance information is generated on the basis of the calculation of the difference image and the data of the second grid pattern.

* * * * *